(12) United States Patent
Cai et al.

(10) Patent No.: US 12,481,194 B2
(45) Date of Patent: *Nov. 25, 2025

(54) DISPLAY AND TERMINAL DEVICE

(71) Applicant: Honor Device Co., Ltd., Shenzhen (CN)

(72) Inventors: Peizhi Cai, Shenzhen (CN); Zheng Tian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/760,124

(22) PCT Filed: Apr. 27, 2022

(86) PCT No.: PCT/CN2022/089668
§ 371 (c)(1),
(2) Date: Apr. 25, 2024

(87) PCT Pub. No.: WO2023/024556
PCT Pub. Date: Mar. 2, 2023

(65) Prior Publication Data
US 2024/0280871 A1 Aug. 22, 2024

(30) Foreign Application Priority Data

Aug. 25, 2021 (CN) .......................... 202110982093.2
Nov. 4, 2021 (CN) .......................... 202111302059.2

(51) Int. Cl.
*G02F 1/16757* (2019.01)
*G02B 26/00* (2006.01)
(Continued)

(52) U.S. Cl.
CPC ....... *G02F 1/16757* (2019.01); *G02B 26/005* (2013.01); *G02F 1/133528* (2013.01);
(Continued)

(58) Field of Classification Search
CPC .... G02F 1/16757; G02F 1/167; G02B 26/005
See application file for complete search history.

(56) References Cited

U.S. PATENT DOCUMENTS 7,852,547 B2 12/2010 Kim
9,419,060 B2 8/2016 Kim et al.
(Continued)

FOREIGN PATENT DOCUMENTS

CN 1881003 A 12/2006
CN 101889245 A 11/2010
(Continued)

*Primary Examiner* — Jia X Pan
(74) *Attorney, Agent, or Firm* — Slater Matsil, LLP

(57) ABSTRACT

This application provides a display and a terminal device, and relates to the field of image display, to resolve a problem of PPI decrease of a semi-emissive and semi-reflective display. The display includes a reflective display layer and an emissive display layer disposed under the reflective display layer, where the reflective display layer includes a first cover plate, an ink filling layer, and a first thin-film transistor TFT electrode layer from top to bottom, and the emissive display layer includes an emissive display module layer and a first substrate from top to bottom; the emissive display module layer includes a plurality of pixels, each pixel includes an effective light transmitting zone and a non-effective light transmitting zone, the effective light transmitting zone includes an emissive luminescent material, and the non-effective light transmitting zone includes a second TFT electrode layer; and the ink filling layer includes a first zone corresponding to the effective light transmitting zone and a second zone corresponding to the non-effective light transmitting zone, where the second zone is filled with an electronic ink material.

20 Claims, 18 Drawing Sheets

(51) Int. Cl.
*G02F 1/1335* (2006.01)
*G02F 1/1362* (2006.01)
*G02F 1/1368* (2006.01)
*G02F 1/167* (2019.01)

(52) U.S. Cl.
CPC .. *G02F 1/136222* (2021.01); *G02F 1/136286* (2013.01); *G02F 1/1368* (2013.01); *G02F 1/167* (2013.01)

(56) References Cited

U.S. PATENT DOCUMENTS

| | | | |
|---|---|---|---|
| 10,627,694 B1* | 4/2020 | Wang | G09G 3/2092 |
| 2006/0285067 A1 | 12/2006 | Kim | |
| 2007/0024954 A1* | 2/2007 | Sakamoto | G02F 1/16757 |
| | | | 359/296 |
| 2009/0147185 A1 | 6/2009 | Quach | |
| 2011/0019262 A1 | 1/2011 | Watanabe | |
| 2012/0032175 A1 | 2/2012 | Wang et al. | |
| 2014/0355099 A1 | 12/2014 | Tsai et al. | |
| 2014/0374716 A1 | 12/2014 | Kim et al. | |
| 2015/0228217 A1* | 8/2015 | Perdices-Gonzalez | |
| | | | G09G 3/3208 |
| | | | 345/5 |
| 2015/0309384 A1 | 10/2015 | Zhang et al. | |
| 2017/0219900 A1 | 8/2017 | Kim et al. | |
| 2018/0052321 A1 | 2/2018 | Kong | |
| 2019/0196239 A1 | 6/2019 | Liu et al. | |
| 2021/0200365 A1* | 7/2021 | Lee | H10K 50/865 |

FOREIGN PATENT DOCUMENTS

| | | |
|---|---|---|
| CN | 101960377 A | 1/2011 |
| CN | 102043284 A | 5/2011 |
| CN | 102707431 A | 10/2012 |
| CN | 103955099 A | 7/2014 |
| CN | 104241327 A | 12/2014 |
| CN | 106199948 A | 12/2016 |
| CN | 106997120 A | 8/2017 |
| CN | 110007541 A | 7/2019 |
| CN | 110133938 A | 8/2019 |
| CN | 110444125 A | 11/2019 |
| CN | 110518148 A | 11/2019 |
| CN | 111799388 A | 10/2020 |
| CN | 112310187 A | 2/2021 |

* cited by examiner

DISPLAY AND TERMINAL DEVICE

CROSS-REFERENCE TO RELATED APPLICATIONS

This application is a National Stage of International Application No. PCT/CN2022/089668, filed Apr. 27, 2022, which claims priority to Chinese Patent Application No. 202110982093.2, filed on Aug. 25, 2021, and Chinese Patent Application No. 202111302059.2, filed Nov. 4, 2021, both of which are hereby incorporated by reference in their entireties.

TECHNICAL FIELD

This application relates to the field of image display, and specifically, to a display and a terminal device.

BACKGROUND

An electronic ink display is a reflective display. When external ambient light is incident on the display, the light is reflected out of the display by ink particles to implement developing. Compared with a liquid crystal display (Liquid Crystal Display, LCD), the electronic ink display does not need a backlight unit to serve as a backlight source. Compared with an organic light-emitting diode (Organic Light-Emitting Diode, OLED) display, the electronic ink display does not need to excite an organic light-emitting diode to emit light. Therefore, the electronic ink display has an advantage of low power consumption.

At present, relatively mature electronic ink display solutions include: 1. microcapsule electronic ink display; and 2. electrowetting electronic ink display. The microcapsule electronic ink display is subject to a retarding effect of filling liquid in microcapsules. As a result, ink particles move at a limited speed, and the display is refreshed at a low speed, which cannot be adapted to dynamic content display. In addition, in terms of color display, the microcapsule electronic ink display adopts a printed color light filter film to display colors by superimposing different levels of gray displayed by the microcapsules and a corresponding color of pixels in the color light filter film. Different levels of gray of the microcapsules are discretely displayed and are limited in number, and therefore types of displayed colors are highly limited and full color gamut display cannot be implemented.

The electrowetting electronic ink display utilizes a surface tension property of liquid to control ink droplets to spread and contract on a hydrophobic layer to implement imaging. Because the ink droplets are agile in shape changing, the electrowetting electronic ink display has a higher refresh rate and a better effect in displaying dynamic content such as videos and GIFs, compared with the microcapsule display. In terms of color display, to implement full color gamut display, the electrowetting display is formed by using three stacked electrowetting structures, and pixels of the three stacked electrowetting structures are sequentially filled with red, green, and blue ink droplets. Shape changing of the ink droplets is continuous, so superposition of three primary color components can implement full color gamut display. However, such structure increases a device thickness of the display, not in line with a current design idea of making terminals thinner and lighter. In addition, blocked out by the upper electrowetting structure, incident light for the bottom electrowetting structure is weakened, resulting in low light reflectivity and color unsaturation.

To further reduce a display thickness while implementing full color gamut display, a "semi-emissive and semi-reflective" display is proposed in the prior art. The display is formed by stacking one emissive display layer and one reflective display layer. The emissive display layer is made of a display material such as an LCD or OLED. The reflective display layer is made of an ink material. The emissive display layer includes first pixel zones and second pixel zones that are alternately arranged. The first pixel zone includes three adjacent pixels for displaying a color image, and the second pixel zone leaves vacancy for three adjacent pixels, to permit passage of a grayscale image displayed by the lower reflective display layer. Because the first pixel zones and the second pixel zones are alternately arranged, pixels per inch (Pixels Per Inch, PPI) of the display is reduced. Consequently, a display resolution significantly decreases and a high-definition image cannot be displayed.

SUMMARY

The technical solutions of this application provide a display and a terminal device, to stack a reflective display layer and an emissive display layer at a pixel level to avoid a PPI decrease of the display.

According to a first aspect, this application provides a display, where the display includes a reflective display layer and an emissive display layer disposed under the reflective display layer, where the reflective display layer includes a first cover plate, an ink filling layer, and a first thin-film transistor TFT electrode layer from top to bottom, and the emissive display layer includes an emissive display module layer and a first substrate from top to bottom; and the emissive display module layer includes a plurality of pixels, each pixel includes an effective light transmitting zone and a non-effective light transmitting zone, the effective light transmitting zone includes an emissive luminescent material, and the non-effective light transmitting zone includes a second TFT electrode layer; and the ink filling layer includes a first zone corresponding to the effective light transmitting zone and a second zone corresponding to the non-effective light transmitting zone, where the second zone is filled with an electronic ink material.

According to the display provided in this application, the reflective display layer and the emissive display layer are stacked at a granularity of pixel, so that each pixel can switch between a grayscale display mode and a color display mode. Therefore, compared with the prior art, the display has no display PPI decrease and ensures a display resolution.

In an implementation of the first aspect, the first zone is filled with a transparent resin material.

The transparent resin material has high light transmittance, so that in the color display mode, light from the effective light transmitting zone under the first zone can effectively and completely pass through the reflective display layer to form a color image.

In an implementation of the first aspect, the first zone is covered with a color light filter film, and a color of the color light filter film is the same as a pixel color in the effective light transmitting zone.

The color light filter film can effectively reduce reflection of a cathode layer in the effective light transmitting zone, avoiding chromatic aberration caused by lightening of a displayed color.

In an implementation of the first aspect, the first TFT electrode layer includes a transparent zone corresponding to the effective light transmitting zone and a non-transparent zone corresponding to the non-effective light transmitting zone, and TFT electrode wiring is arranged in the non-transparent zone.

Arrangement of TFT electrode wiring in the non-transparent zone can improve light transmittance of the effective light transmitting zone, and improve a display effect of the emissive display layer in the color display mode.

In an implementation of the first aspect, the reflective display layer further includes a second substrate, and the second substrate is located on a side of the first TFT electrode layer close to the emissive display module layer.

In an implementation of the first aspect, the emissive display layer further includes a second cover plate, and the second cover plate is located on a side of the emissive display module close to the first TFT electrode layer.

In an implementation of the first aspect, the substrate or the cover plate is a glass base material.

Using a glass substrate or a glass cover plate can increase support strength of the display.

In an implementation of the first aspect, the substrate or the cover plate is a flexible base material.

Replacing the glass substrate/cover plate with a flexible base material can reduce a thickness of the display.

In an implementation of the first aspect, in a grayscale display mode, the first TFT electrode layer controls the second zone of the ink filling layer to display grayscale effects, and the second TFT electrode layer controls the effective light transmitting zone of the emissive display module layer to turn black.

In an implementation of the first aspect, in a color display mode, the second TFT electrode layer controls the effective light transmitting zone of the emissive display module layer to turn colored, and the first TFT electrode layer controls the second zone of the ink filling layer to turn black.

According to the display provided in this application, the reflective display layer and the emissive display layer are stacked in an up-and-down stacking direction, and switching between reflective display and emissive display is implemented through switching between the color display mode and the grayscale display mode.

In an implementation of the first aspect, the second zone is filled with a microcapsule ink material or an electrowetting ink material.

In an implementation of the first aspect, the emissive display module layer is an organic light-emitting diode OLED display module.

The OLED display module features high brightness, fast response, and high definition, and therefore can improve the display effect in the color display mode. In addition, an aperture ratio of an OLED pixel is small, and a non-effective light transmitting zone occupies a large area of the pixel. An ink material may be added to the second zone with a larger area at the reflective display layer to increase a pixel aperture ratio at the ink display layer, so as to improve the display effect in the grayscale display mode.

In an implementation of the first aspect, the second zone is filled with an electrowetting ink material, and the emissive display module layer is an OLED display module, where
in the second zone, a transparent hydrophobic layer is disposed below ink droplets, and a reflective metal layer is disposed on a side of the transparent hydrophobic layer facing away from the ink droplets; and
the effective light transmitting zone includes a cathode layer, an electron injection layer, an electron transport layer, an organic self-luminous layer, a hole transport layer, a hole injection layer, and an anode layer from top to bottom, where the organic self-luminous layer is added with organic display materials of different colors.

According to a second aspect, this application provides a display, where the display includes a reflective display layer and an emissive display layer disposed under the reflective display layer, where
the reflective display layer includes a first cover plate, an ink filling layer, and a first thin-film transistor TFT electrode layer from top to bottom, and the emissive display layer includes an emissive display module layer, a second TFT electrode layer, and a first substrate from top to bottom; and
the emissive display module layer includes a plurality of pixels, the ink filling layer is filled with an electronic ink material, and an electrochromic layer is disposed between the reflective display layer and the emissive display layer.

According to the display provided in this application, the reflective display layer and the emissive display layer are stacked at a granularity of pixel, so that each pixel can switch between a grayscale display mode and a color display mode. Therefore, compared with the prior art, the display has no display PPI decrease and ensures a display resolution.

In an implementation of the second aspect, the first TFT electrode layer includes a transparent zone and a non-transparent zone with respect to each pixel, and TFT electrode wiring is arranged in the non-transparent zone.

Arrangement of TFT electrode wiring in the non-transparent zone can improve light transmittance of the emissive display layer, and improve a display effect of the emissive display layer in the color display mode.

In an implementation of the second aspect, the reflective display layer further includes a second substrate, and the second substrate is located between the first TFT electrode layer and the electrochromic layer.

In an implementation of the second aspect, the emissive display layer further includes a second cover plate, and the second cover plate is located on a side of the emissive display module layer close to the electrochromic layer.

In an implementation of the second aspect, the substrate or the cover plate is a glass base material.

Using a glass substrate or a glass cover plate can increase support strength of the display.

In an implementation of the second aspect, the substrate or the cover plate is a flexible base material.

Replacing the glass substrate/cover plate with a flexible base material can reduce a thickness of the display.

In an implementation of the second aspect, in a grayscale display mode, reflectivity of the electrochromic layer is controlled to be not less than a first threshold, and the first TIFT electrode layer controls the ink filling layer to display grayscale effects.

In an implementation of the second aspect, in a color display mode, the reflectivity of the electrochromic layer is controlled to be not greater than a second threshold, the first TIFT electrode layer controls the ink filling layer to turn transparent, and the second TFT electrode layer controls the emissive display module layer to turn colored.

According to the display provided in this application, the reflective display layer and the emissive display layer are stacked in an up-and-down stacking direction, and switching between reflective display and emissive display is implemented through switching between the color display mode and the grayscale display mode.

In an implementation of the second aspect, the ink filling layer is filled with an electrowetting ink material, and the emissive display module layer is a LCD display layer; at the ink filling layer, a transparent hydrophobic layer is disposed below ink droplets; and the emissive display layer includes a front polarizer, the emissive display module layer, the second TFT electrode layer, the first substrate, a rear polarizer, and a backlight unit from top to bottom.

In this implementation, the LCD emissive display layer is provided, and the electrowetting ink display layer is provided to avoid blocking out the lower LCD display layer, so as to ensure normal switching and usage of both the grayscale display mode and the color display mode.

According to a third aspect, this application provides a terminal device, where the terminal device includes the display according to the first aspect or the second aspect.

It can be understood that for beneficial effects of the terminal device provided according to the second aspect, reference may be made to the beneficial effects in the first aspect and any implementation thereof. Details are not repeated herein.

DETAILED DESCRIPTION OF ILLUSTRATIVE EMBODIMENTS

Figure 1:
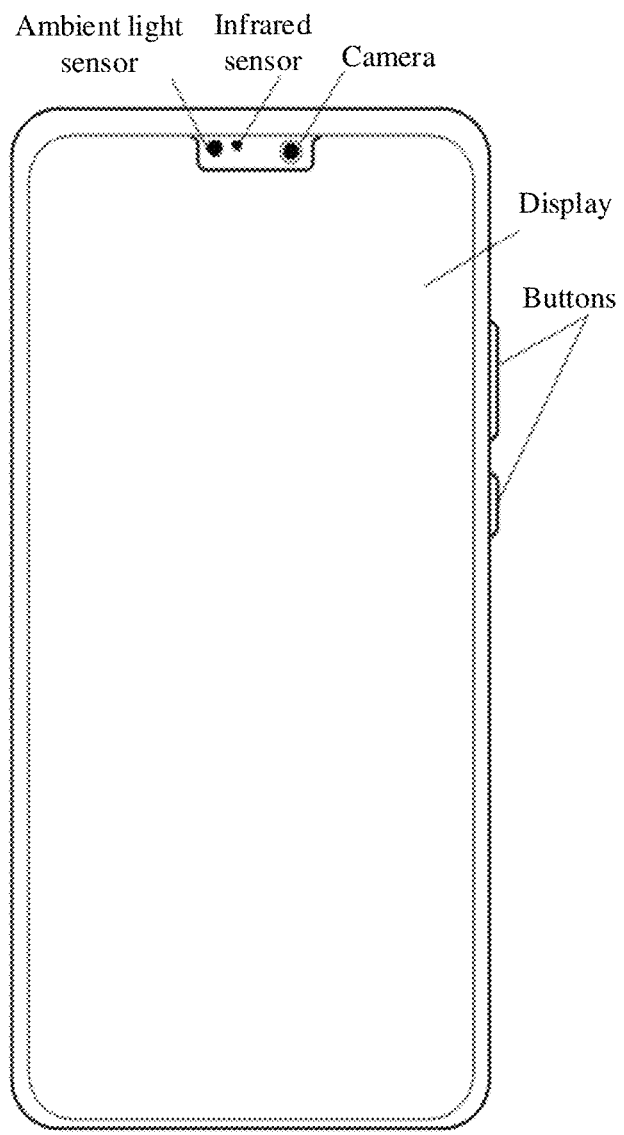
FIG. 1 is a schematic structural diagram of a terminal according to an embodiment of this application.

The following describes technical solutions of this application with reference to accompanying drawings. Obviously, the described embodiments are merely some but not all of the embodiments of this application.

In addition, the terms such as "first" and "second" are merely intended for a purpose of description, and shall not be understood as an indication or implication of relative importance or an implicit indication of the number of the indicated technical features. Therefore, a feature limited by "first", "second", or the like may explicitly or implicitly include one or more features.

In addition, in this application, the orientation terms such as "central", "upper", "lower", "left", "right", "top", and "bottom" are defined with respect to the schematic orientation or location of the accompanying drawings. It should be understood that these directional terms are relative concepts, are used in relative description and clarification, are not intended to indicate or imply that the apparatuses or components mentioned must have specific orientations or be constructed and operated for a specific orientation, and may correspondingly change with the placed orientation of the components in the drawings, and therefore shall not be construed as a limitation to this application.

It should also be noted that in the embodiments of this application, a same component or a same part is represented by a same reference numeral. For a same part in the embodiments of this application, a reference numeral for only one part or component may be used as an example in the figure, and it should be understood that the reference numeral applies to other identical parts or components.

In this application, a terminal may include a handheld device, a vehicle-mounted device, a wearable device, a computing device, or another processing device connected to a wireless modem. The terminal may also include a cellular phone (cellular phone), a smart phone (smart phone), a personal digital assistant (personal digital assistant, PDA) computer, a tablet computer, a laptop computer (laptop computer), a machine type communication (machine type communication, MTC) terminal, a point of sale (point of sale, POS), an in-vehicle computer, and another terminal with an imaging capability. In the embodiments of this application, the terminal may also be referred to as a terminal device.

Figure 2:
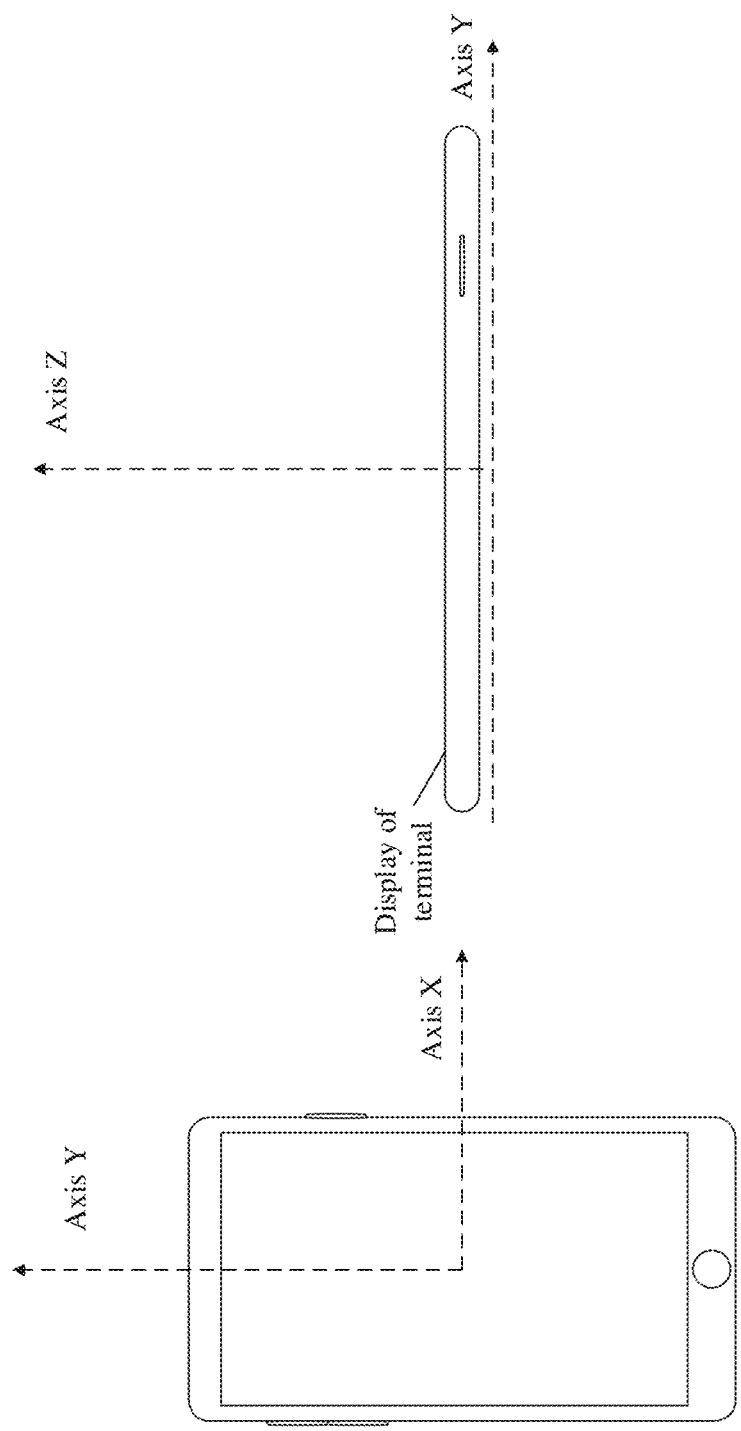
FIG. 2 is a schematic diagram of a three-axis posture of a terminal according to an embodiment of this application.

The embodiments of this application impose no special limitation on a specific form of the terminal. For ease of description and understanding, an example in which the terminal is a mobile phone is used for description in this application. As shown in FIG. 1, the terminal includes components such as a display, buttons, a camera, an infrared sensor, and an ambient light sensor. The terminal further includes internal components such as a processor, an internal memory, an antenna, a speaker, a receiver, and a gravity sensor (not shown in the figure). This application proposes a design solution for a display. For ease of description, this application first defines three axis directions of the terminal. As shown in FIG. 2, facing toward the display of the terminal, a short side of the terminal is defined as an axis-X direction, a long side of the terminal is defined as an axis-Y direction, and a direction that is perpendicular to the display of the terminal and that is of emergent light of the display is an axis-Z direction. The "direction of emergent light of the display" mentioned later in this application is the axis-Z direction in FIG. 2, and "from top to bottom of the display" is a direction opposite to the axis Z, namely, an incident direction of ambient light.

Display principles of a microcapsule display and an electrowetting display are described below:

1. Microcapsule Display

Figure 3:
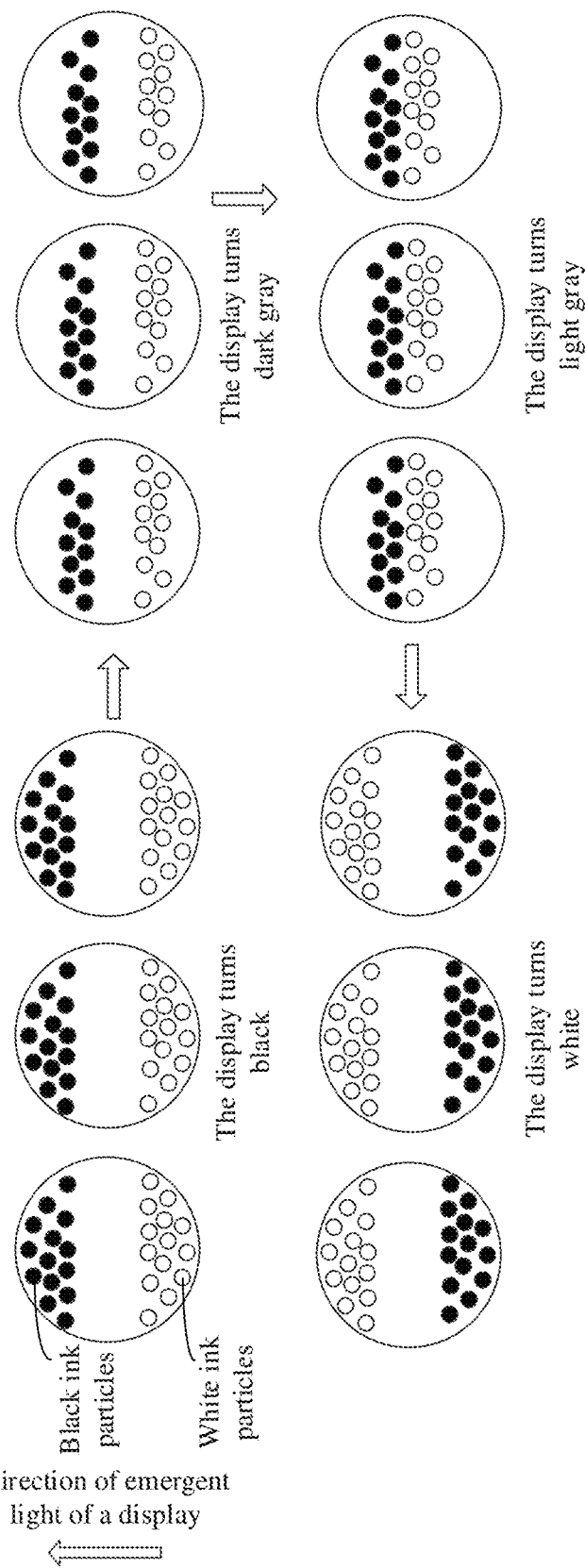
FIG. 3 is a schematic diagram of a display principle of a microcapsule electronic ink display.

As shown in FIG. 3, the microcapsule display includes countless microcapsules, and the microcapsule is filled with a plurality of black ink particles and a plurality of white ink particles. The ink particles of the two colors have opposite charges. In addition, transparent filling liquid for supporting suspension of the ink particles is also added between the ink particles. When a forward voltage is applied to the microcapsule, the black ink particles move to the top of the microcapsule, and the white ink particles move to the bottom of the microcapsule. In this case, ambient light outside the display is reflected by the black ink particles after irradiating into the display, and the display turns black to naked eyes. When a reverse voltage is applied to the microcapsule, the two types of ink particles move in an opposite way, and the display turns white.

At present, in addition to displaying black and white, most microcapsule displays support a grayscale display mode, such as GC4, GC8, or GC16. GC (Grey Clean) means grayscale clearing, and 4, 8, or 16 indicates the maximum levels of gray supported by different modes. At present, an electronic ink display can support up to 16 levels of gray for display, namely, GC16 mode. This mode provides a total of 16 levels of grayscale display effects from 0 to 15. Level 0 corresponds to white, level 15 corresponds to black, and levels 1 to 14 correspond to increasingly darkening gray colors between white and black. Certainly, in practical application, there are also solutions in which level 0 is defined as black and level 15 is defined as white, which is not limited in the embodiments of this application. As shown in FIG. 3, when different levels of gray between black and white are displayed, the black and white ink particles are no longer driven to the top or bottom of the microcapsule, but move to and suspend at specified locations in the microcapsule, so as to meet requirements of displaying different levels of gray.

Figure 4:
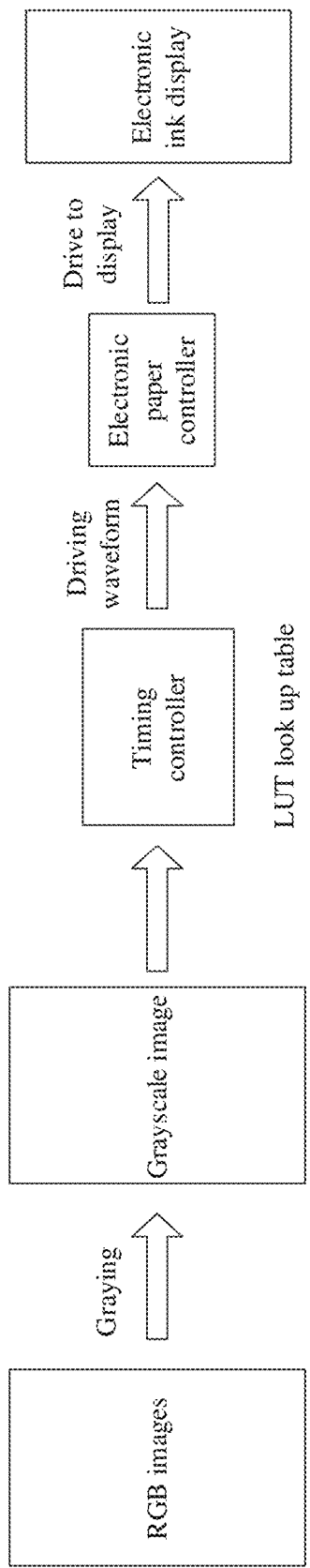
FIG. 4 is a schematic flowchart of image display of a microcapsule electronic ink display.

As shown in FIG. 4, when a frame of image is being displayed, firstly, an RGB image is subjected to graying to convert RGB values of each pixel in the image into 16-level grayscale values, and then a timing controller circuit performs a look up table (Look Up Table, LUT) operation to obtain a driving waveform (waveform) of the pixel. The driving waveform includes a current/voltage, a pulse duration, a pulse period, and other parameter information that the pixel needs to display the current frame. After receiving a driving waveform corresponding to each pixel in the current frame, an electronic paper controller drives a microcapsule corresponding to the pixel of the electronic ink display based on parameter information carried by the driving waveform, to control each of black and white ink particles in the microcapsule to move from a current location to a next location, so that the electronic ink display is refreshed to display content of a next frame of image.

An LUT table is an electronic ink display drive mapping table that an electronic ink display supplier obtains and records based on display hardware testing. The table records driving waveforms of pixels that correspond to different display requirements/conditions. Dependent variables affecting the mapping table generally include: a next-frame gray level of the pixel, a current-frame gray level of the pixel, and a current display temperature. The next-frame gray level of the pixel determines a moved-to location of an ink particle, and the current-frame gray level of the pixel corresponds to a current location of the ink particle. The display temperature needs to be taken into account because viscosity of filling liquid in microcapsules varies under different temperatures. For a same driving waveform, higher viscosity of the filling liquid means that an ink particle is more difficult to move. If a moving distance of the ink particle is insufficient, a display becomes too dark or too light, affecting a display effect. Therefore, it is necessary to adjust the driving waveform based on a current display temperature to ensure that the ink particle can accurately move to designated locations under different temperatures, so as to achieve sufficient and accurate grayscale presentation. Generally, viscosity of filling fluid is negatively correlated with a temperature, that is, a lower temperature indicates greater viscosity of the filling fluid.

In the LUT table, all permutations and combinations of the three parameters of "next-frame gray level", "current-frame gray level", and "current display temperature" are given, and each permutation and combination is mapped to one corresponding driving waveform parameter to form the above mapping table. During the look up table operation, the timing controller circuit obtains a next-frame grayscale image from a system on chip (System on Chip, SOC), and obtains a gray level of each pixel therefrom; and then obtains a current-frame grayscale image from a cache, and obtains a gray level of each pixel in the current frame. Then, the timing controller circuit queries the SOC for temperature data of the electronic ink display. The data is monitored and obtained by a temperature sensor disposed inside the terminal and close to a backlight plate of the electronic ink display, and transmitted to the SOC. After obtaining the data, the timing controller circuit uses the three pieces of data as dependent variables to look up a corresponding driving waveform in the LUT table. After driving waveforms corresponding to all pixels in the next frame of image are obtained, the look up table process is completed.

2. Electrowetting Display

Figure 5:
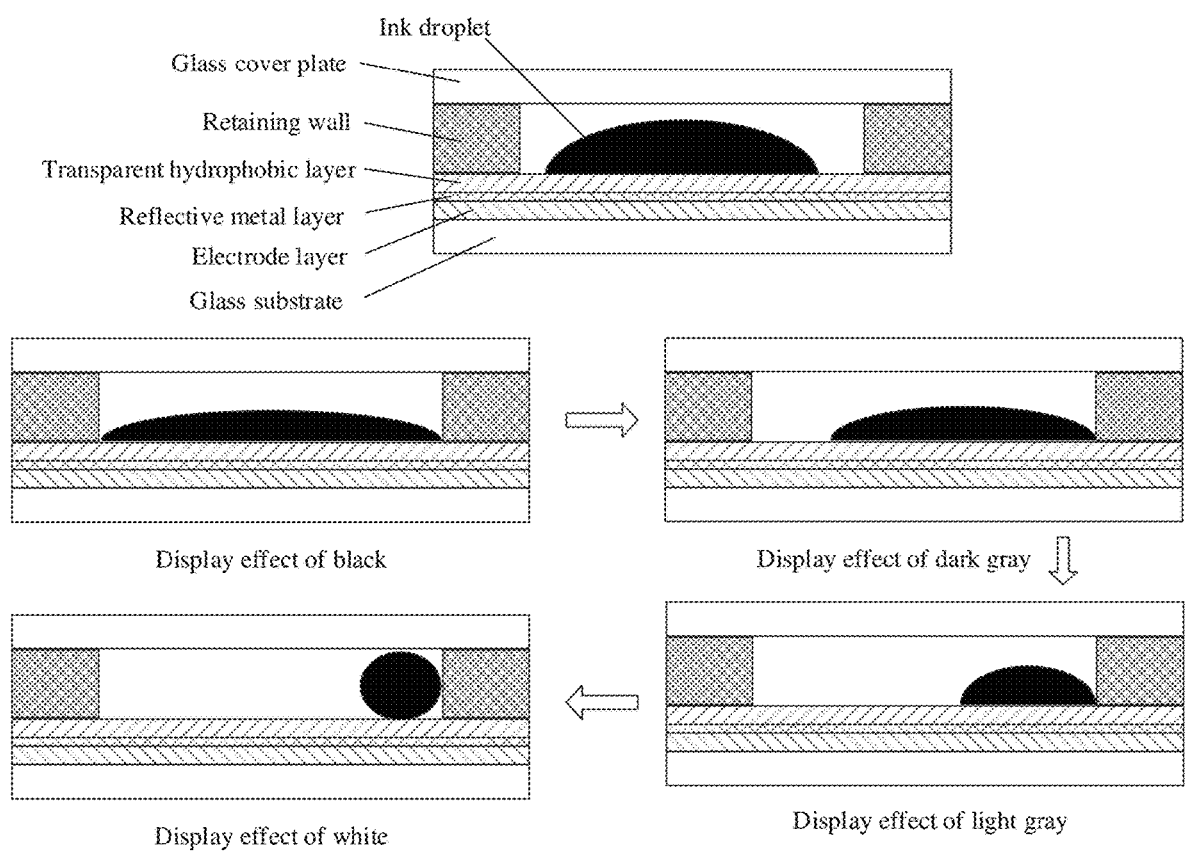
FIG. 5 is a schematic diagram of a display principle of an electrowetting electronic ink display.

As shown in FIG. 5, an electrowetting display structurally includes a glass cover plate, a retaining wall, a transparent hydrophobic layer, a reflective metal layer, an electrode layer, and a glass substrate from top to bottom. Black oily ink droplets, also referred to as ink droplets, are added at the transparent hydrophobic layer. When the ink droplets spread all over the entire transparent hydrophobic layer, the ink droplets completely block the reflective metal layer under the transparent hydrophobic layer. Ambient light outside the display irradiates on the ink droplets, and then is reflected by the ink droplets out of the display to present a black color. When the ink droplets contract to corners of the hydrophobic layer, the reflective metal layer under the hydrophobic layer is exposed from most zones of pixels. Ambient light outside the display irradiates on the reflective metal layer, and then is reflected by the reflective metal layer out of the display to present a white color.

When the ink droplets are in a state between the foregoing two boundary states, a gray tone can be displayed through joint reflection by the black ink droplets and the reflective metal layer. Different levels of gray from light to dark can be displayed by adjusting a proportion of occlusion by ink droplets. Unlike the microcapsule display, the ink droplets have a smooth and continuous shape changing process, and therefore can theoretically display infinite grayscale effects between white and black.

In the prior art, it takes time, usually more than 150 ms, for black and white ink particles in a microcapsule display to move. Particularly, in a low temperature environment, affected by increased viscosity of filling liquid, such time can be more than 200 ms. In a global refresh mode, such time is further increased to be more than 340 ms, which severely limits a display refresh rate and is not suitable for dynamic content display. Taking a minimum dynamic frame rate of 15 frames per second for example, a refresh time of one frame of image does not exceed 67 ms. Obviously, the microcapsule display cannot reach this refresh rate.

The so-called global refresh means performing screen clearing once before driving black and white ink particles from a location (for example, gray level 5) corresponding to a current frame of image to a location (for example, gray level 8) corresponding to a next frame of image, to drive all the black ink particles to the bottom of a microcapsule and drive all the white ink particles to the top of the microcapsule, so that the black and white ink particles are then driven from the bottom or top to the location corresponding to the next frame of image (a location corresponding to gray level 8). Significance of the global refresh is to eliminate a screen ghost image accumulated by multiple local refreshes. Because there is a small error in moving distances of the ink particles during each refresh, such distance error grows to an extent that can be observed by naked eyes after multiple refreshes, resulting in the ghost image. The black and white ink particles can be "reset" by the global refresh before the next frame of image is displayed, and then driven to the required locations, thereby eliminating accumulation of errors.

A refresh rate of the electrowetting display is much higher than that of the microcapsule display. Ink droplets of the electrowetting display change more quickly in response to driving waveforms, and resistance between the ink droplets and the transparent hydrophobic layer is nearly zero, offering the electrowetting display an incomparable advantage over the microcapsule display in terms of refresh rate. The electrowetting display usually needs 20 ms to 30 ms to refresh a frame of image, and can better adapt to display of dynamic content such as waterfall pages, UI animation, GIFs, and videos.

Figure 6:
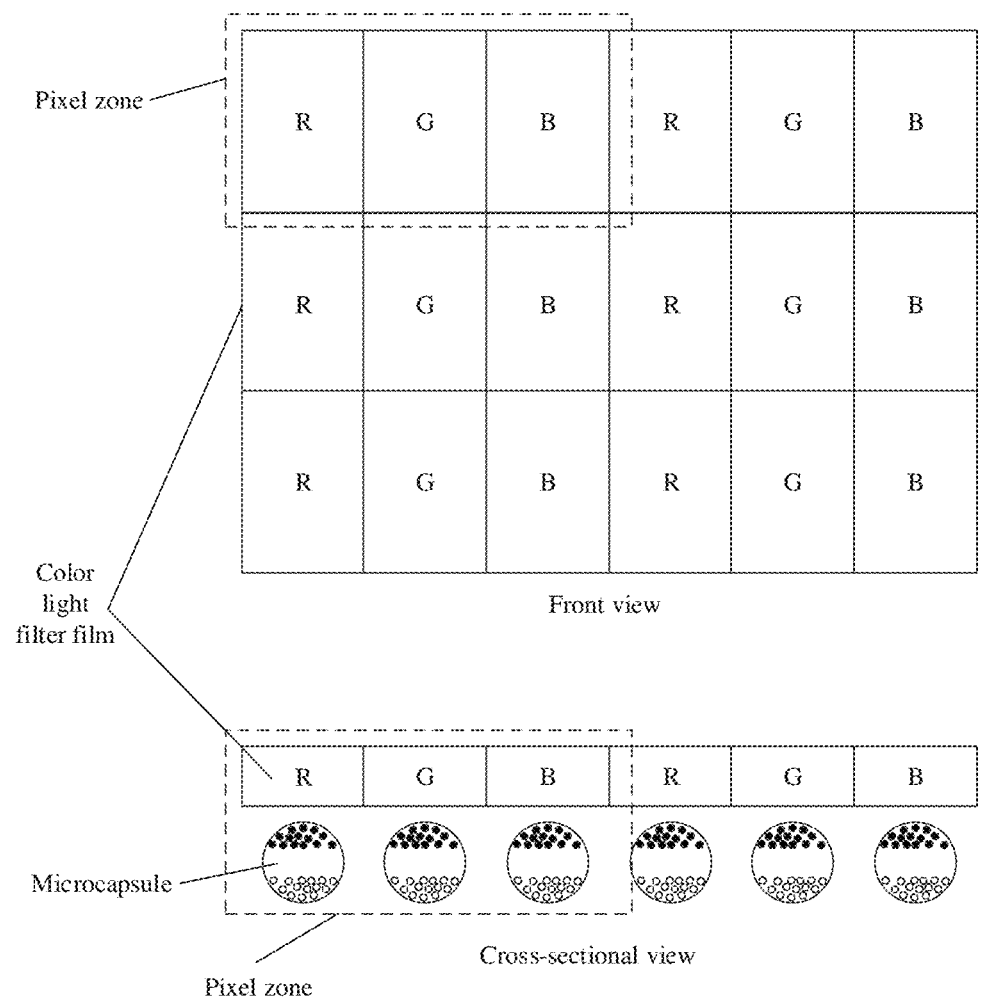
FIG. 6 is a schematic structural diagram of a color microcapsule electronic ink display.

In terms of color display, the microcapsule display adopts a printed color electronic paper technology that prints a layer of color light filter film on the microcapsule layer. As shown in FIG. 6, a front view of FIG. 6 is based on an observation perspective opposite to an axis Z, that is, a perspective of looking towards a display, and a section of a cross-sectional view is based on a perspective of looking towards an XZ plane. For the color light filter film, adjacent R, G, and B light filtering zones are used as a pixel zone, and each pixel zone vertically corresponds to three adjacent pixels of the lower microcapsule layer, and gray level changes of pixels present different colors through the color light filter film. As mentioned above, each pixel supports a maximum of 16 gray levels, meaning that one pixel zone on the color light filter film can display only a total of 16*16*16, namely, 4096 colors at most, which strictly limits a color gamut and is far from satisfying usage requirements.

Figure 7:
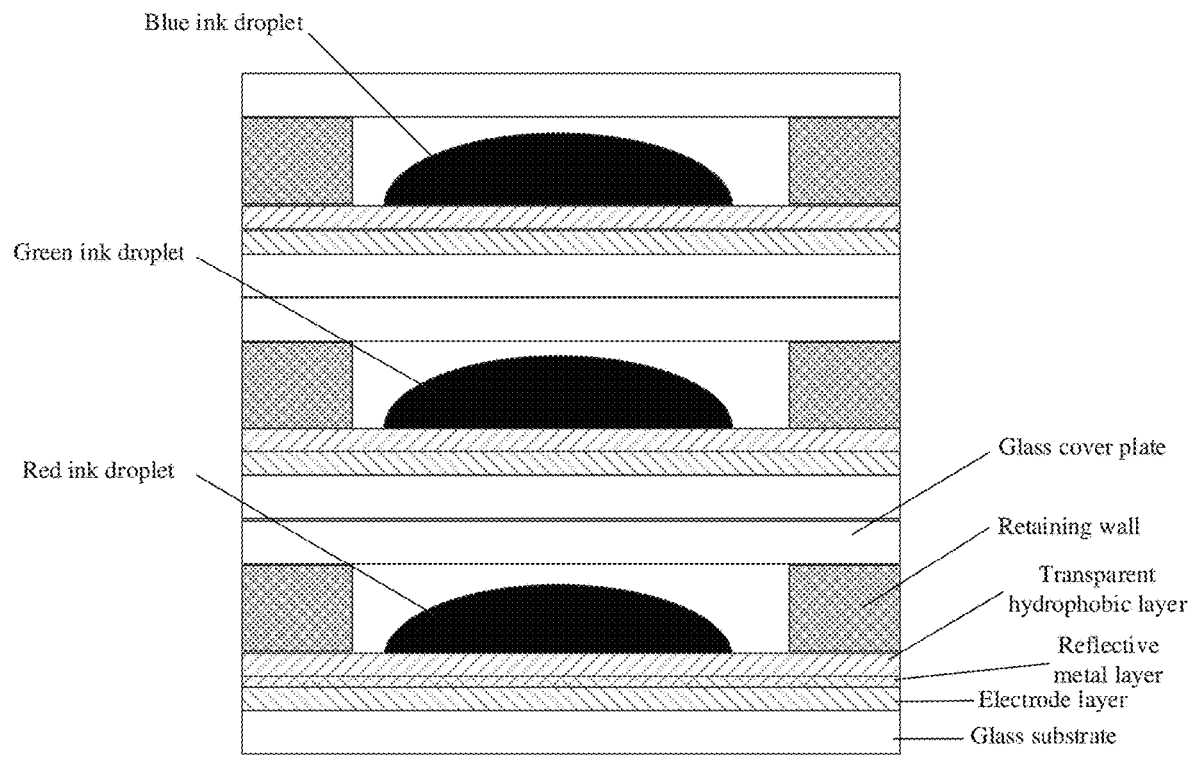
FIG. 7 is a schematic structural diagram of a color electrowetting electronic ink display.

By contrast, the electrowetting display has three separate electrowetting layers stacked. As shown in FIG. 7, a bottom electrowetting layer is filled with red ink droplets, and a middle electrowetting layer is filled with green ink droplets, and a top electrowetting layer is filled with blue ink droplets. As mentioned above, ink droplets have a smooth and continuous shape changing process, and can output almost infinite grayscale effects. Therefore, a much wider color gamut is supported by a display of three stacked layers.

However, this solution cannot overcome a problem that a display device is excessively thick. For example, in a structure shown in FIG. 7, an electrowetting layer includes a glass cover plate, a retaining wall, a transparent hydrophobic layer, an electrode layer, and a glass substrate from top to bottom. For ease of light reflection by a bottom electrowetting layer, reflective metal layers of a top electrowetting layer and a middle electrowetting layer are removed, and only a reflective metal layer of the bottom electrowetting layer is retained. After irradiating into the display, external light passes through blue, green and red electrowetting structures in turn, and is reflected out of the display by the bottom metal reflective layer. For any electrowetting layer, a glass cover plate or glass substrate is about 0.3 mm thick, which can be reduced to 0.15 mm through an acid etching process. For ease of description, 0.15 mm is used as a thickness of a glass cover plate/substrate in the following descriptions of this application. Generally, the ink droplet layer, the transparent hydrophobic layer, the electrode layer, and the metal reflective layer each have a thickness of less than 5 µm, which is negligible compared with the thickness of the glass cover plate/substrate. It can be learned that in the structure shown in FIG. 7, a thickness of one electrowetting layer is approximately a sum of a thickness of a glass cover plate and a thickness of a glass substrate, that is, about 0.3 mm. An overall thickness of the three stacked electrowetting layers reaches 0.9 mm. Compared with a traditional electrowetting display, LCD display, or OLED display (one glass cover plate layer+one glass substrate layer), the display doubles in thickness.

It should be noted that for ease of displaying a shape of an ink droplet, a display layer in which the ink droplet is located is enlarged in FIG. 5 and FIG. 7, and thicknesses of layers in the figures do not indicate real thicknesses in practical application. This is not noted for subsequent drawings of this application.

To further reduce a display thickness while implementing full color gamut display, a "semi-emissive and semi-reflective" display is proposed in the prior art. Emissive display is a display manner using an LCD, an OLED, a MICRO LED, or the like, in which light is generated inside a display, passes through the display, and enters human eyes to implement imaging. Reflective display is a display manner using the above-mentioned microcapsules or electrowetting electric paper.

Figure 8:
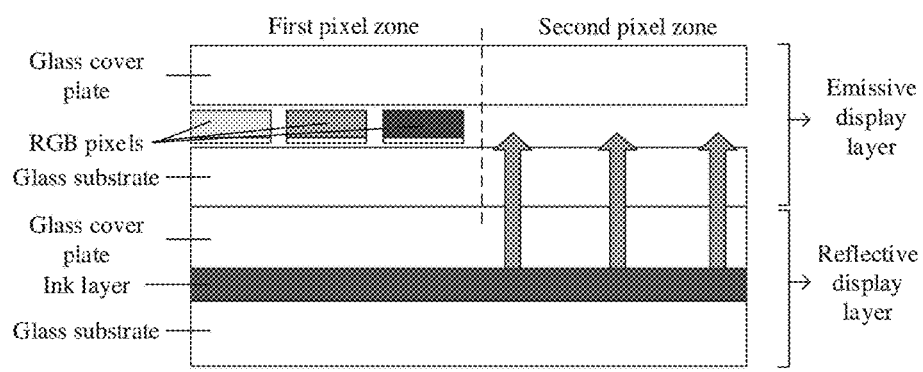
FIG. 8 is a schematic structural diagram of a semi-emissive and semi-reflective display.

As shown in FIG. 8, in this solution, a display includes one emissive display layer and one reflective display layer from top to bottom, and the emissive display layer includes first pixel zones and second pixel zones that are alternately arranged. The first pixel zone includes three adjacent pixels on the left of the figure, which correspond to R, G, and B pixels of the emissive display layer. The second pixel zone leaves vacancy for three adjacent pixels to transmit content displayed by the lower reflective display layer.

In a color display mode, RGB pixels at the emissive display layer are used for full gamut color display, and the reflective display layer displays black to reduce display interference with the emissive display layer. In a black and white display mode, the reflective display layer displays a corresponding level of gray based on a requirement, and the RGB pixels at the emissive display layer are de-energized to be displayed in black, so as to reduce display interference with the reflective display layer.

It can be seen that the structure shown in FIG. 8 includes only four glass cover plate/substrate layers, and has an overall thickness of about 0.6 mm, reduced by one third compared with the structure shown in FIG. 7 while ensuring full color gamut display. However, the alternate arrangement of the first and second pixel zones decreases a display PPI by half, greatly reducing a display resolution and making it impossible to display a high-definition image.

In view of this, this application proposes a pixel-level display integration solution that an emissive display structure and a reflective display structure are stacked at a pixel level, to avoid a display PPI decrease of the solution in FIG. 8.

Figure 9:
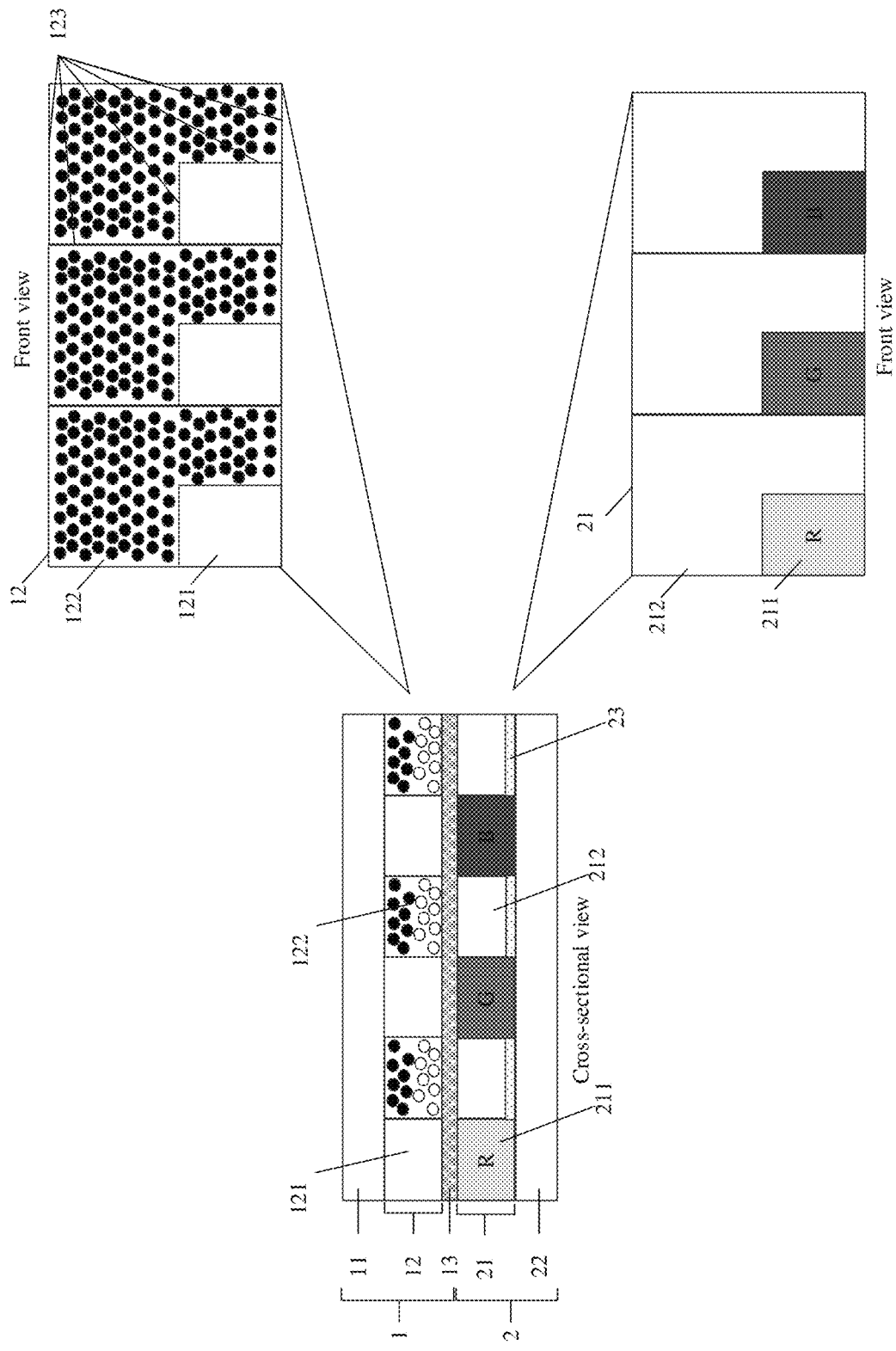
FIG. 9 is a schematic structural diagram of a first display according to an embodiment of this application.

As shown in FIG. 9, this application provides a display. A front view is based on a perspective opposite to an axis Z, that is, a perspective of looking towards the display, and a section of a cross-sectional view is based on a perspective of looking towards an XZ plane. The display includes a reflective display layer 1 and an emissive display layer 2 from top to bottom. The reflective display layer 1 includes a first cover plate 11, an ink filling layer 12, and a first thin-film transistor TFT electrode layer 13 from top to bottom. The emissive display layer 2 includes an emissive display module layer 21 and a first substrate 22 from top to bottom.

The emissive display module layer 21 includes a plurality of pixels arranged in an XY plane, and each pixel includes an effective light transmitting zone 211 and a non-effective light transmitting zone 212. The effective light transmitting zone 211 is used to display one of R, G, and B color components, and the non-effective light transmitting zone 212 includes a second TFT electrode layer 23 used to drive the emissive display module layer 21. The non-effective light transmitting zone 212 is made of a transparent resin material that wraps a TFT circuit and wiring, and is not used as a light-emitting zone of the pixel.

A smallest structural unit of the emissive display module layer 21 is a pixel, each pixel is used to display one color component, three adjacent pixels form one pixel zone, and one pixel zone is a smallest display unit to implement full color gamut display. In an implementation, one R pixel, one G pixel, and one B pixel form one pixel zone. In another implementation, one R pixel, two G pixels, and one B pixel form one pixel zone. A pixel zone including one R pixel, one G pixel, and one B pixel is used as an example for latter description of this application. In practical application, neither the number nor color type of pixels in the pixel zone is limited.

At the reflective display layer 1, the ink filling layer 12 includes a first zone 121 corresponding to the effective light transmitting zone 211 and a second zone 122 corresponding to the non-effective light transmitting zone 212. "Corresponding to" means that the two zones have the same shape and size on the XY plane, and have projections in the axis-Z direction that can completely overlap. Certainly, "completely overlap" in the axis-Z direction, namely, the projection direction, may have a deviation in product implementation. In this application, the first zone 121 and the second zone 122 are surrounded by a retaining wall 123, the first zone 121 is not filled with materials, the second zone 122 is filled with an electronic ink material, and light emitted by the effective light transmitting zone 211 of the emissive display module layer 21 can pass through the first zone 121 of the ink filling layer 12 and exit the display.

In a grayscale display mode, the reflective display layer 1 is used for display. In this case, the electronic ink material in the second zone 122 of the ink filling layer 12 is driven by a first TFT electrode layer 13 to display different grayscale effects such as black, white, and gray in the second zone 122. In addition, at the emissive display layer 2, the second TFT electrode layer 23 in the non-effective light transmitting zone 212 powers off the emissive display module layer 21, so that the effective light transmitting zone 211 turns black and no longer emits RGB light, to avoid display interference with the reflective display layer 1.

In a color display mode, the emissive display layer 2 is used for display. The second TFT electrode layer 23 in the non-effective light transmitting zone 212 controls the effective light transmitting zone 211 at the emissive display module layer 21 to emit RGB light. The light passes through the first zone 121 of the reflective display layer 1 and exits the display to display color content. In addition, the first TFT electrode layer 13 drives the electronic ink material in the second zone 122 of the ink filling layer 12, so that the second zone 122 turns black. This can occlude TFT wiring of the second TFT electrode layer 23 in the non-effective light transmitting zone 212 to avoid display interference with the emissive display layer 2.

In this application, the second zone 122 turning black can effectively block external ambient light reflected by the TFT circuit and wiring, and can also minimize ambient light reflected by ink particles themselves. If the second zone 122 turns white, light mixing occurs after white light reflected by white ink particles is mixed with RGB light, resulting in a "whitish" display. Black light from black ink particles and RGB light have a higher contrast ratio, and therefore light mixing can be effectively resolved and display effects can be improved.

In an implementation, under a condition of moderately compromising a display effect, dark gray may be used to occlude the second TFT electrode layer 23, that is, the second zone 122 turns dark gray. For example, in the foregoing 16-level grayscale mode, if gray level 15 corresponds to a black display effect, display effects corresponding to gray level 8 to gray level 14 may be determined as dark gray effects. Alternatively, in the foregoing 8-level grayscale mode, if gray level 8 corresponds to a black display effect, display effects corresponding to gray level 4 to gray level 7 may be determined as dark gray effects.

Figure 10A:
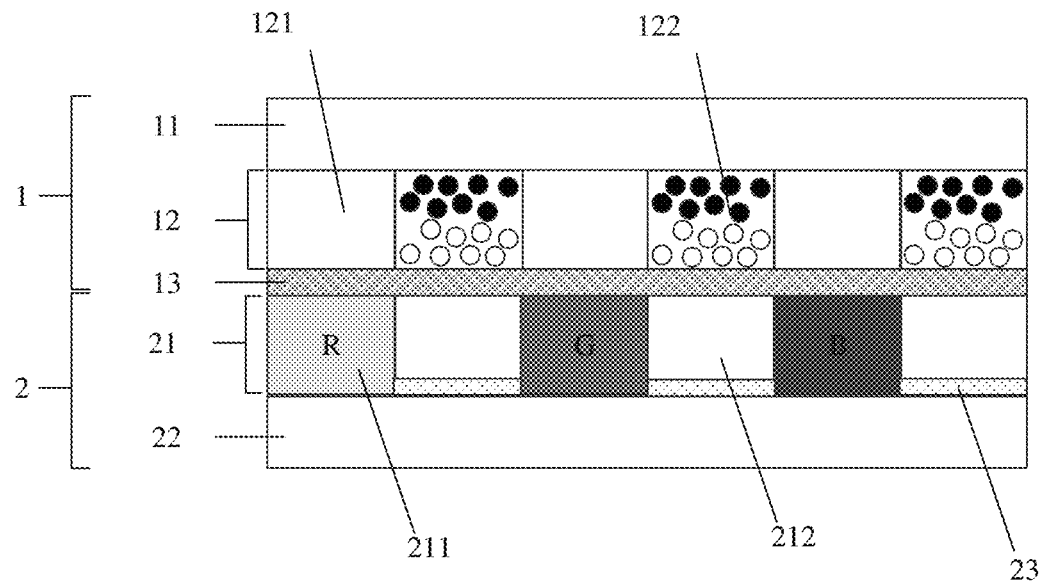
FIG. 10(a) is a schematic structural diagram of a second display according to an embodiment of this application.
Figure 10B:
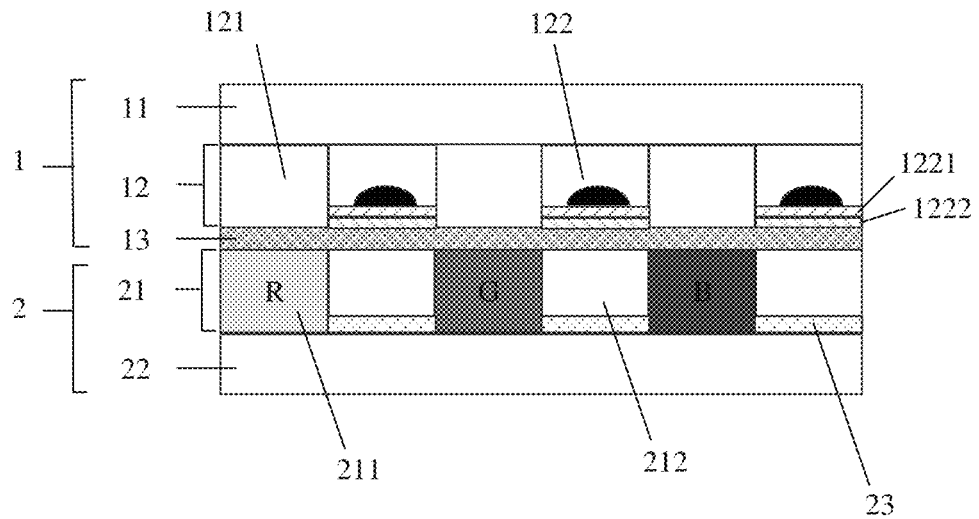
FIG. 10(b) is a schematic structural diagram of a third display according to an embodiment of this application.

The display proposed in this application may use a microcapsule ink material to fill the second zone 122, as shown in FIG. 10(*a*), or may use an electrowetting ink material to fill the second zone 122, as shown in FIG. 10(*b*). In the latter implementation, a transparent hydrophobic layer 1221 needs to be provided below ink droplets in the second zone 122, and a reflective metal layer 1222 needs to be provided on a side of the transparent hydrophobic layer 1221 facing away from the ink droplets. For driving methods of microcapsule ink particles and electrowetting ink droplets, refer to the foregoing description. Details are not repeated herein. The microcapsule ink material is used as an example for latter description in this application. Unless otherwise specified, the microcapsule solution can be replaced with an electrowetting solution.

Compared with the display in FIG. 8, the display provided in this application can avoid a PPI decrease of the display, and ensure a display resolution of the display. This is because in the solution in FIG. 8, adjacent pixel zones are used as an emissive display zone and a reflective display zone respectively. If a display has N pixels in total, the number of pixels used for emissive display and the number of pixels used for reflective display are both N/2. When one of the zones is used for display, the other zone is in an idle state and cannot be effectively used, resulting in that PPI of the display is halved. However, in this application, the ink material is superimposed on the non-effective light transmitting zone 212 at the pixel level to combine a reflective display mechanism and an emissive display mechanism, so that each pixel of the display can perform reflective display and emissive display. In other words, N pixels of the display are usable for emissive display, and the N pixels are also usable for reflective display. Compared with the solution in FIG. 8, the PPI of the display is not decreased. In addition, when the effective light transmitting zone 211 of the emissive display module layer 21 emits light, the non-effective light transmitting zone 212 itself does not emit light for display. Therefore, superimposing the ink material on the non-effective light transmitting zone 212 does not affect the emissive display mechanism in this application.

Figure 11:
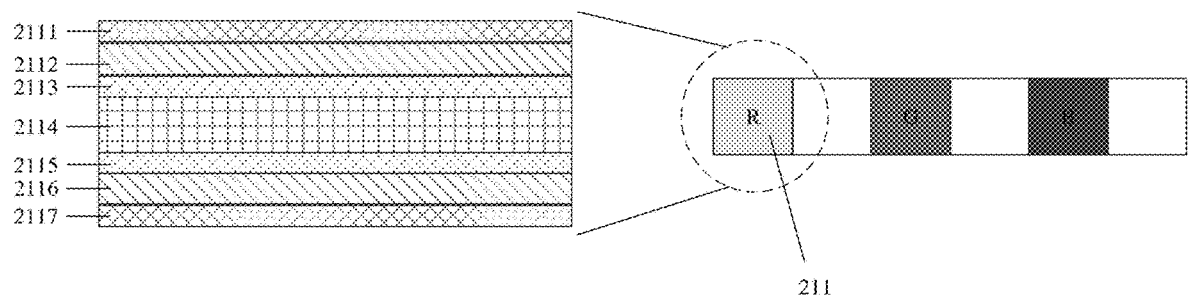
FIG. 11 is a schematic diagram of layers of an effective light transmitting zone according to an embodiment of this application.

In one implementation, an OLED display module is used as the emissive display module layer 21. As shown in FIG. 11, the effective light transmitting zone 211 of the OLED display module includes a cathode layer 2111, an electron injection layer 2112, an electron transport layer 2113, an organic self-luminous layer 2114, a hole transport layer 2115, a hole injection layer 2116, and an anode layer 2117 from top to bottom. RGB colors emitted by pixels are determined by organic display materials of different colors added at the organic self-luminous layer 2114.

In the prior art, an aperture ratio of an OLED pixel is usually about 10%. The so-called aperture ratio is a ratio of a light transmitting zone of the pixel to an entire zone of the pixel, and the entire zone of the pixel includes the light transmitting zone and an opaque zone. In this application, referring to FIG. 9, an aperture ratio of an OLED pixel is equal to effective light transmitting zone 211/(effective light transmitting zone 211+non-effective light transmitting zone 212), or equivalent to first zone 121/(first zone 121+second zone 122).

Due to high luminous brightness of the OLED pixel, a low aperture ratio of the pixel does not affect display of the display. In this application, the second zone 122 with a higher area ratio is used to implement the electronic ink display. This can effectively ensure color density of the display in the grayscale display mode, thereby avoiding color distortion caused by too few ink particles. For example, when there are too few black ink particles, a light-colored gap between black dot matrices displayed on the display widens. As a result, a dark image becomes lighter to an observer.

In this solution, with no materials added in the first zone 121, the ink filling layer 12 is inconsistent in thicknesses, affecting structural stability. Therefore, in an implementation, the first zone 121 may be filled with a transparent resin material, and the material is the same as the ink material in thickness. The transparent resin material has high light transmittance and therefore does not occlude light emitted by the effective light transmitting zone 211, thereby avoiding affecting an OLED display effect.

Figure 12:
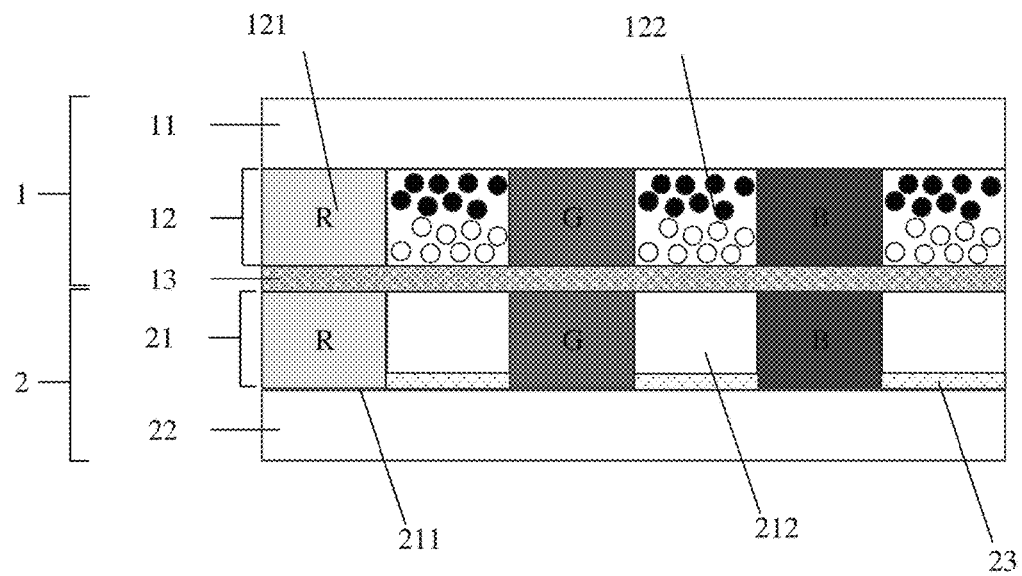
FIG. 12 is a schematic structural diagram of a fourth display according to an embodiment of this application.
Figure 13A:
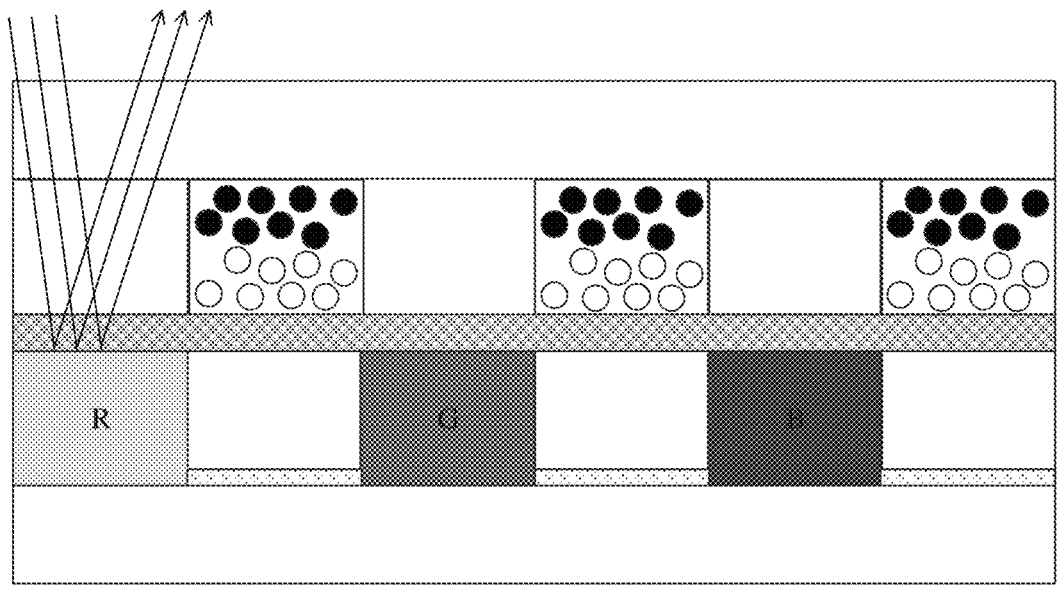
FIG. 13(a) is a schematic diagram of reflecting ambient light by a display according to an embodiment of this application.
Figure 13B:
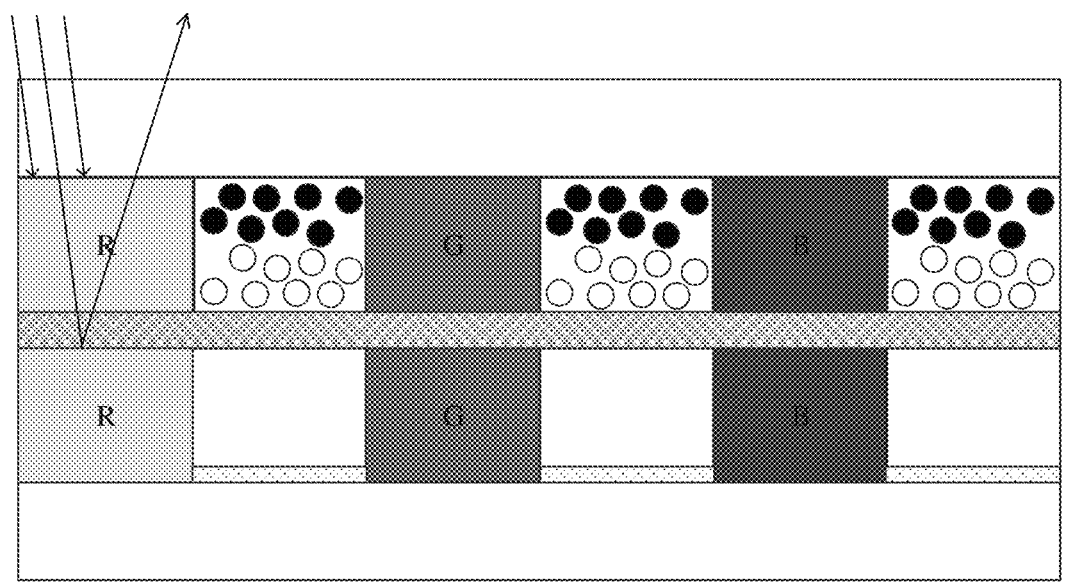
FIG. 13(b) is a schematic diagram of reflecting ambient light by another display according to an embodiment of this application.

Further, the first zone 121 may alternatively be filled with a color light filter film instead of the transparent resin. As shown in FIG. 12, the first zone 121 is filled with a color light filter film instead of the transparent resin. When a thickness of the color light filter film is smaller than a thickness of the first zone 121, multiple color light filter films may be stacked, so that a total thickness of the stacked color light filter films is or approximately the same as the thickness of the first zone 121. In addition, a color of the color light filter films is the same as a pixel color in the effective light transmitting zone 211 below the color light filter films. In this solution, a purpose of adding the color light filter film is to reduce ambient light reflected by the effective light transmitting zone 211. As mentioned above, the OLED display module includes the cathode layer 2111 that is usually made of a metal material and therefore can reflect light. As shown in FIG. 13(a), upon entering the display along an opposite direction of the axis Z, external ambient light is reflected out of the display by the cathode layer 2111, resulting in chromatic aberration in a pixel color seen by an observer. For example, the color becomes lighter. The color light filter film can polarize and filter the ambient light. As shown in FIG. 13(b), when ambient light irradiates on the color light filter film, only light whose component corresponds to a color of the filter film can pass through the color filter film and reach the cathode layer 2111. This reduces the amount of incident light and reduces light reflection. In addition, when the incident light is reflected out of the color light filter film, because the color of the light is the same as the color of the color light filter film, chromatic aberration can be "corrected" to avoid lightening of the displayed color.

In addition to the foregoing manners, in practical application, the first zone 121 may alternatively be filled with a transparent resin material, and a color light filter film may be added over or under the transparent resin material.

In addition to the advantages described above, the display in FIG. 12 has the following advantage over the traditional OLED display: no need to add a polarizer at an upper layer of the OLED display module. In the prior art, a cathode layer 2111 in which OLED pixels are located, and a TFT circuit and wiring in a non-effective light transmitting zone 212 all reflect external ambient light, affecting display quality. Therefore, a polarizer is added above an OLED display module to reduce the amount of light entering and exiting the OLED display module, so as to reduce display reflection. In this solution, the color light filter film is used to reduce light reflected by OLED pixels, and the ink material displayed in black is used to occlude TFT wiring to prevent light reflection, so that display reflection is resolved without using a polarizer.

Figure 14:
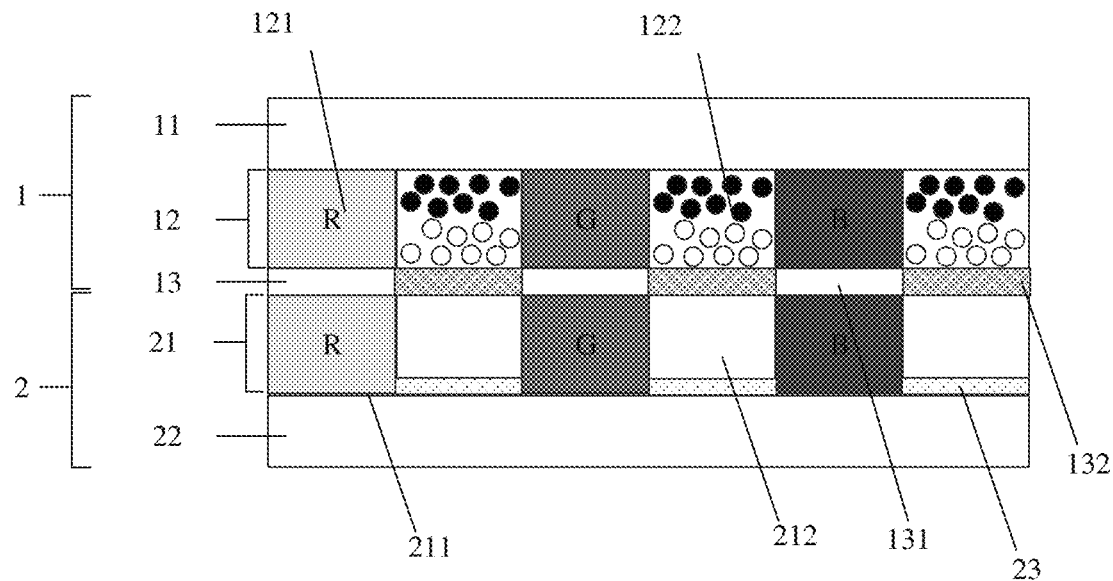
FIG. 14 is a schematic structural diagram of a fifth display according to an embodiment of this application.

In practical application, TFT wiring at the first TIFT electrode layer 13 occludes some light emitted by the effective light transmitting zone 211, resulting in reduced display quality of the display in the color display mode. In this regard, when TFT wiring is being arranged, TIFT wiring density at a location, corresponding to the effective light transmitting zone 211, of the first TFT electrode layer 13 may be reduced, and corresponding TFT wiring may be moved to a location, corresponding to the non-effective light transmitting zone 212, of the first TIFT electrode layer 13. In another implementation of this application, to completely resolve the problem of light being blocked out by the TFT electrode layer, as shown in FIG. 14, the first TFT electrode layer 13 is divided into a transparent zone 131 and a non-transparent zone 132. The transparent zone 131 corresponds to the effective light transmitting zone 211, and the non-transparent zone 132 corresponds to the non-effective light transmitting zone 212. No TFT wiring is arranged in the transparent zone 131, and all TFT wiring at the first TFT electrode layer 13 is arranged in the non-transparent zone 132. The TFT electrode layer of the display is extremely thin, and therefore the transparent zone 131 does not need to be filled with transparent resin.

"Corresponding to" in the above description has the same meaning as "corresponding to" in FIG. 9, and therefore is not repeated herein.

Figure 15:
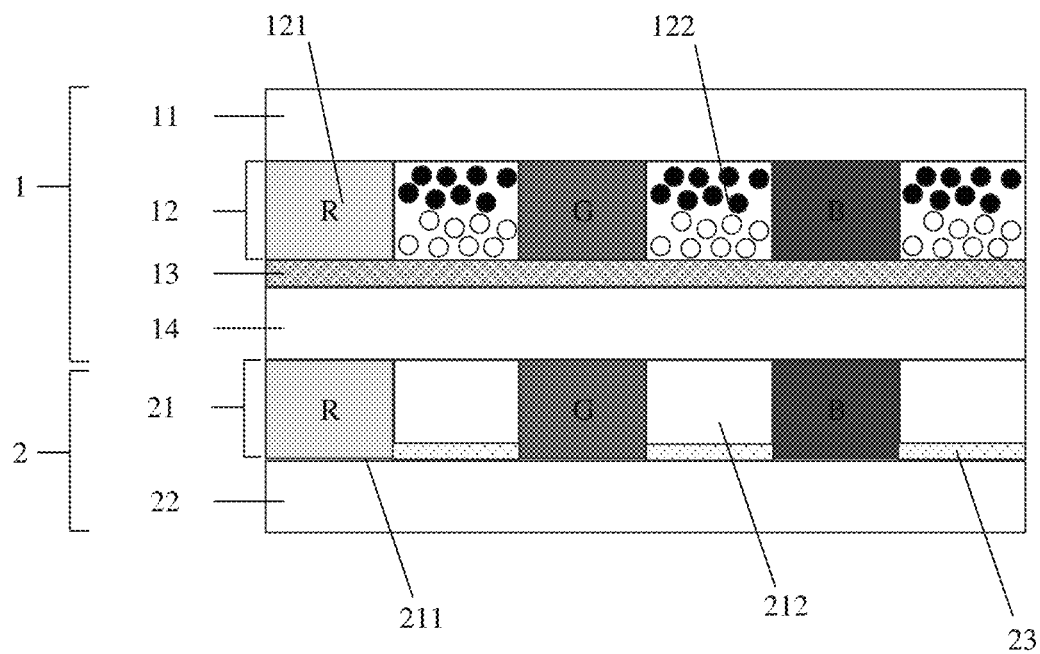
FIG. 15 is a schematic structural diagram of a sixth display according to an embodiment of this application.

Further, this application further provides a display, as shown in FIG. 15, the display includes a first cover plate 11, an ink filling layer 12, a first TFT electrode layer 13, a second substrate 14, an emissive display module layer 21, and a first substrate 22 from top to bottom. In this solution, the second substrate 14 is added to the display. A reflective display layer 1 and an emissive display layer 2 share the second substrate 14 of the reflective display layer 1. The second substrate 14 is used as a substrate of the reflective display layer 1 and also as a cover plate of the emissive display layer 2. Alternatively, in another solution, the second substrate 14 in FIG. 15 is replaced with a second cover plate 24. In this case, the reflective display layer 1 and the emissive display layer 2 share the second cover plate 24 of the emissive display layer 2 (not shown in the figure). In practical application, the first TFT electrode layer 13 may be formed on the second substrate 14 or the second cover plate 24 by using a low temperature poly-silicon (Low Temperature Poly-silicon, LTPS for short) process. Compared with the solution in FIG. 9, this solution has added one substrate/cover plate layer, and therefore can increase support strength of the display.

Figure 16:
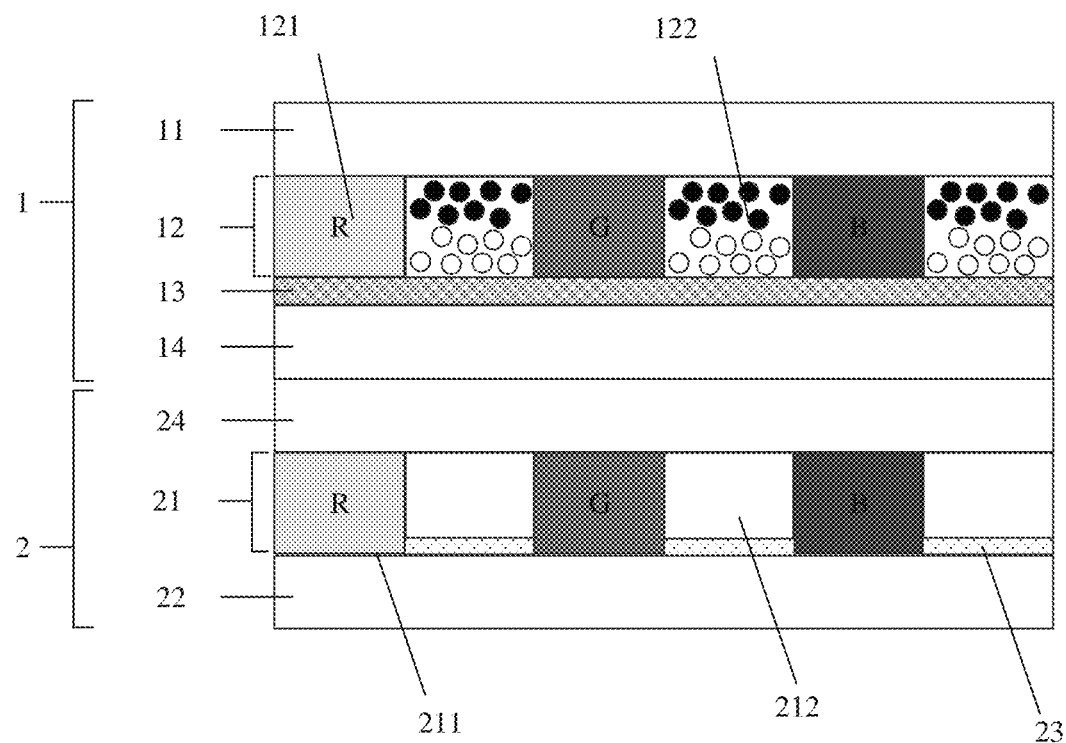
FIG. 16 is a schematic structural diagram of a seventh display according to an embodiment of this application.

Further, as shown in FIG. 16, a display includes a first cover plate 11, an ink filling layer 12, a first TFT electrode layer 13, a second substrate 14, a second cover plate 24, an emissive display module layer 21, and a first substrate 22 from top to bottom. Compared with the solution in FIG. 15, a reflective display layer 1 and an emissive display layer 2 each have a separate cover plate and substrate. From a perspective of process, the reflective display layer 1 and the emissive display layer 2 are directly stacked and bonded by optical glue to form the display, with no need to separately form the first TFT electrode layer 13 of the reflective display layer 1 on the intermediate substrate/cover plate, thereby simplifying a display manufacturing process and increasing a yield.

The substrate and the cover plate in each example of this application are required to have good light transmittance. Therefore, in practical application, glass base materials may be used as the substrate and the cover plate. In terms of display thickness, the display in FIG. 15 has three layers of glass substrates/cover plates. Based on an assumption that one layer of glass substrate is 0.15 mm thick, a thickness of the display can be decreased from 0.6 mm to 0.45 mm, that is, reduced by 25%, compared with the prior art shown in FIG. 8.

Further, at least one of the first cover plate 11, the second substrate 14, the second cover plate 24, and the first substrate 22 may alternatively be made of a flexible base material. A thickness of the flexible base material is about 0.005 mm, which is negligible compared with a thickness of a glass substrate. The flexible base material in this solution may be made of a resin or silicon nitride (SiNx) material.

Figure 17A:
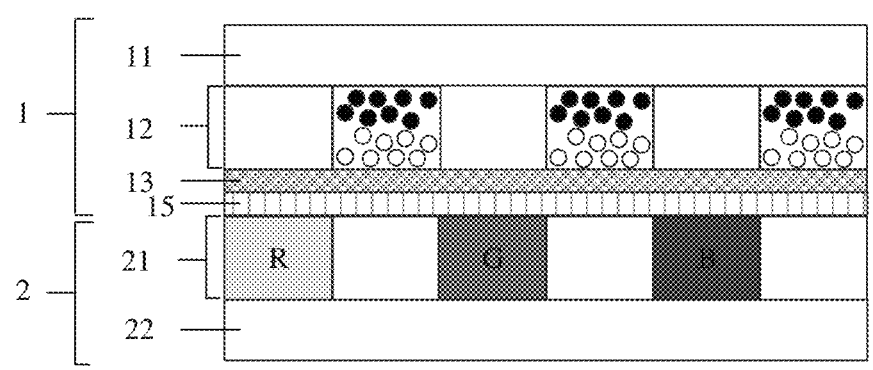
FIG. 17(a) is a schematic structural diagram of an eighth display according to an embodiment of this application.

The display with three substrate layers in FIG. 15 is used as an example. The second substrate 14 or the second cover plate 24 may be replaced with a flexible base material. As shown in FIG. 17(a), a display includes a first cover plate 11, an ink filling layer 12, a first TFT electrode layer 13, a first flexible thin film 15, an emissive display module layer 21, and a first substrate 22 from top to bottom. Alternatively, as shown in FIG. 17(b), a display includes a first cover plate 11, an ink filling layer 12, a first TFT electrode layer 13, a second flexible thin film 25, an emissive display module layer 21, and a first substrate 22 from top to bottom.

The display with four substrate layers in FIG. 16 is used as an example. Both the second substrate 14 and the second cover plate 24 may alternatively be replaced with a flexible base material. As shown in FIG. 17(c), a display includes a first cover plate 11, an ink filling layer 12, a first TIFT electrode layer 13, a first flexible thin film 15, a second flexible thin film 25, an emissive display module layer 21, and a first substrate 22 from top to bottom.

Figure 17B:
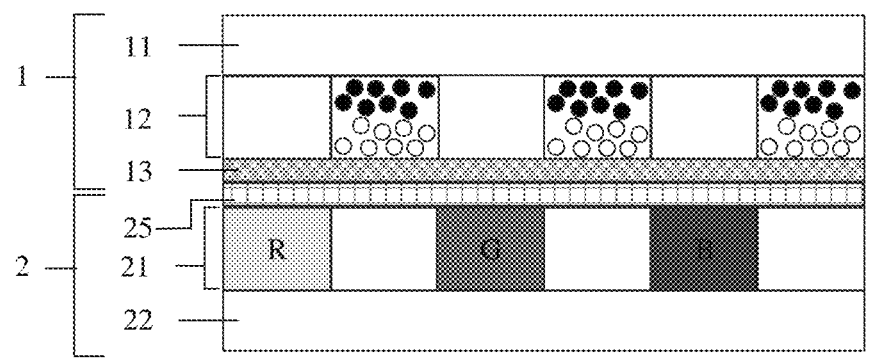
FIG. 17(b) is a schematic structural diagram of a ninth display according to an embodiment of this application.
Figure 17C:
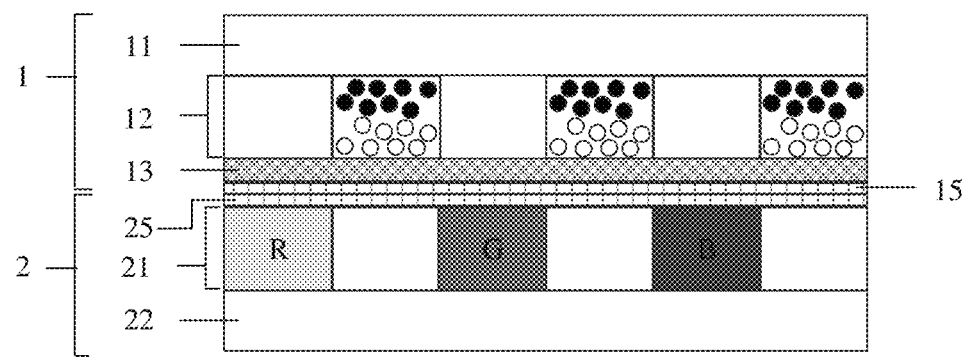
FIG. 17(c) is a schematic structural diagram of a ninth display according to an embodiment of this application.

The solutions in FIG. 17(a), FIG. 17(b), and FIG. 17(c) can optimize the three-layer or four-layer glass substrate structure into a two-layer glass substrate structure, and therefore can reduce the thickness of the display to 0.3 mm.

Figure 18A:
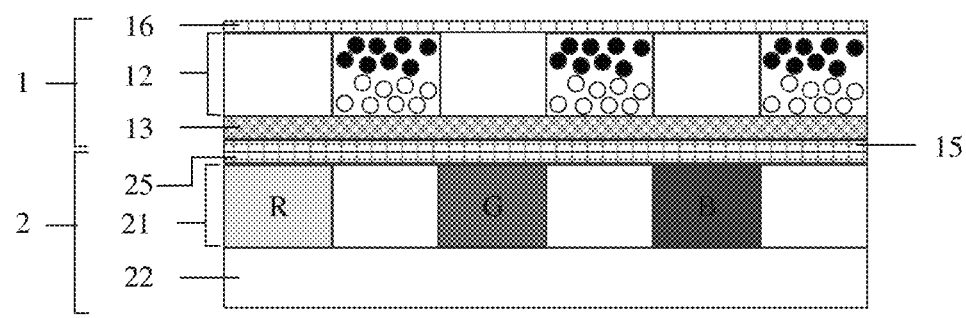
FIG. 18(a) is a schematic structural diagram of an eleventh display according to an embodiment of this application.

Further, the first cover plate 11 may alternatively be replaced with a flexible base material. As shown in FIG. 18(a), a display includes a third flexible thin film 16, an ink filling layer 12, a first TFT electrode layer 13, a first flexible thin film 15, a second flexible thin film 25, an emissive display module layer 21, and a first substrate 22 from top to bottom.

Figure 18B:
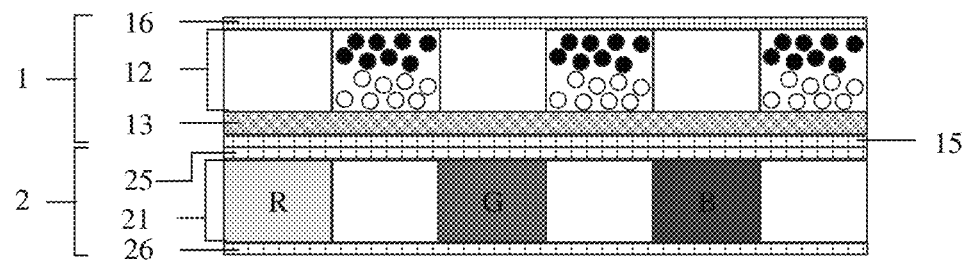
FIG. 18(b) is a schematic structural diagram of a twelfth display according to an embodiment of this application.

Further, the first substrate 202 may alternatively be replaced with a flexible base material. As shown in FIG. 18(b), a display includes a third flexible thin film 16, an ink filling layer 12, a first TFT electrode layer 13, a first flexible thin film 15, a second flexible thin film 25, an emissive display module layer 21, and a fourth flexible thin film 26 from top to bottom. The solution in FIG. 18(b) can completely eliminate the use of a glass cover plate/substrate, and an overall thickness of the display can be controlled at about 0.05 mm. Compared with the thickness of 0.6 mm of the display in FIG. 8, the thickness can be reduced by 91.6%. In addition, the solution in FIG. 18(b) can be used for a flexible display.

Figure 19:
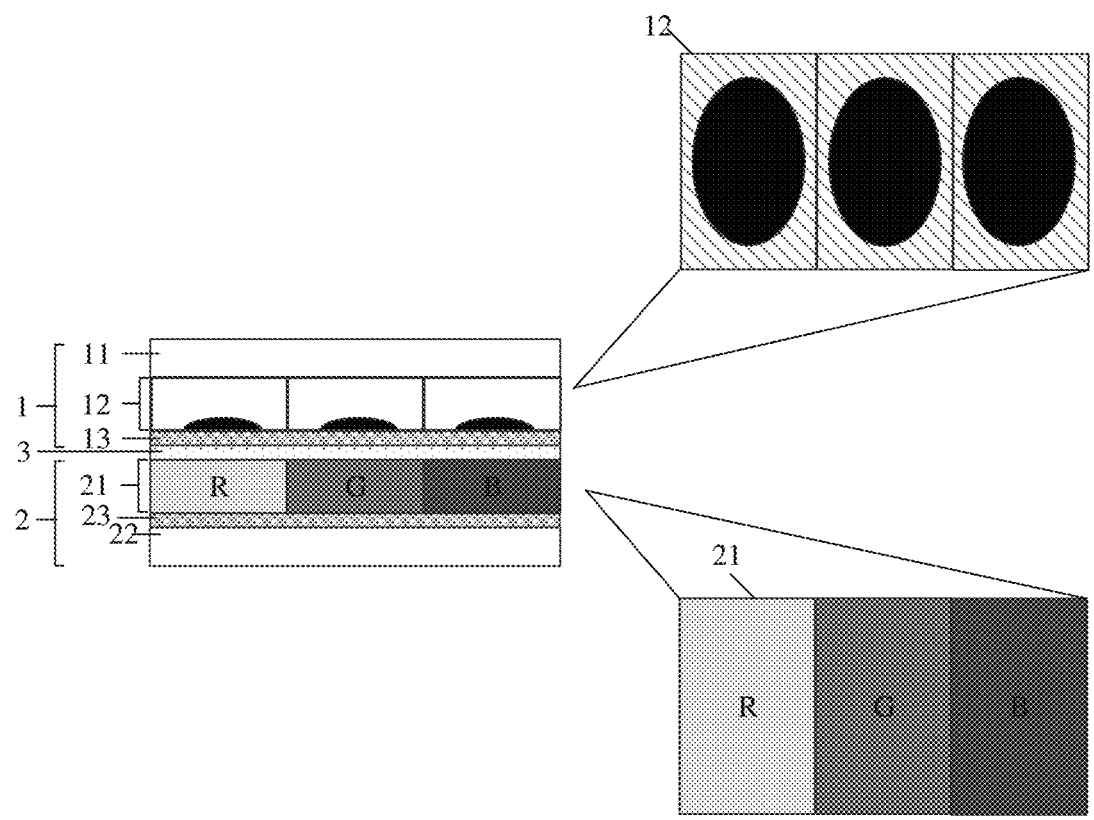
FIG. 19 is a schematic structural diagram of a thirteenth display according to an embodiment of this application.

In an implementation of this application, the ink filling layer 12 is filled with an electrowetting material, and an LCD display module serves as the emissive display layer 2. As shown in FIG. 19, along a direction opposite to an axis Z, a display includes a reflective display layer 1 and an emissive display layer 2 disposed under the reflective display layer 1 from top to bottom.

The reflective display layer 1 includes a first cover plate 11, an ink filling layer 12, and a first TFT electrode layer 13 from top to bottom. The emissive display layer 2 includes an emissive display module layer 21, a second TFT electrode layer 23, and a first substrate 22 from top to bottom. An electrochromic layer 3 is disposed between the reflective display layer 1 and the emissive display layer 2.

The emissive display module layer 21 includes a plurality of arranged pixels. Each pixel is used to display one of R, G, and B color components, three adjacent pixels form one pixel zone, and one pixel zone is a smallest display unit to implement full color gamut display. The ink filling layer is filled with an electronic ink material.

Figure 20:
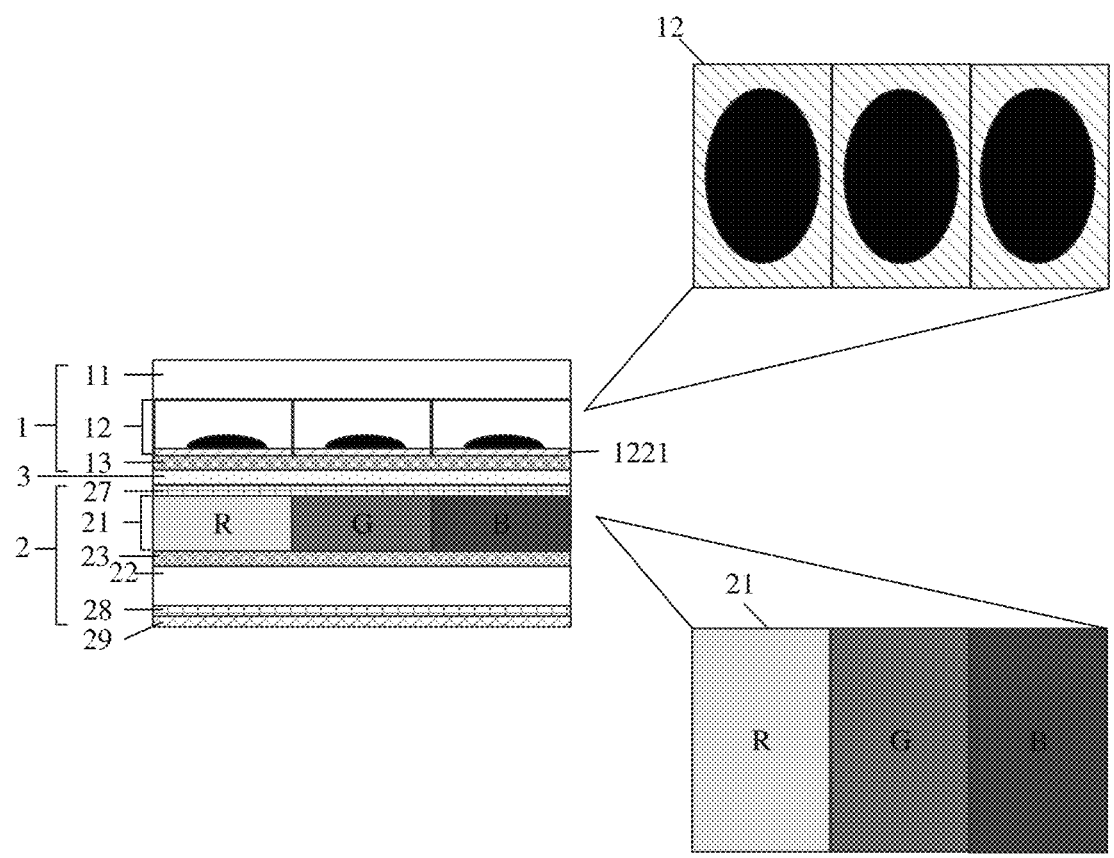
FIG. 20 is a schematic structural diagram of a fourteenth display according to an embodiment of this application.

In an implementation of this application, as shown in FIG. 20, a transparent hydrophobic layer 1221 is arranged below ink droplets at the ink filling layer 12. The emissive display layer 2 includes a front polarizer 27, the emissive display module layer 21, the second TFT electrode layer 23, the first substrate 22, a rear polarizer 28, and a backlight unit 29 from top to bottom.

The emissive display module layer 21 is formed by stacking RGB filter films and a liquid crystal layer along the direction opposite to the axis Z. On an XY plane, a pixel at the emissive display module layer 21 is not divided into an effective light transmitting zone 211 and a non-effective light transmitting zone 212. In an OLED display structure, RGB light-emitting points and a TFT circuit are arranged at one layer, namely, the emissive display module layer 21. A zone in which the RGB light-emitting points are located is the above-mentioned effective light transmitting zone 211, and a zone in which the TFT circuit is located is the above-mentioned non-effective light transmitting zone 212. No separate TFT electrode layer is provided under the emissive display module layer 21. By contrast, a liquid crystal layer and a TFT circuit in an LCD display are designed to be upper and lower layers. In other words, the liquid crystal layer is the foregoing emissive display module layer 21, and a second TFT electrode layer 23 is further provided below the emissive display module layer 21. In such structure, an entire pixel at the emissive display module layer 21 is an effective light transmitting zone, and is not divided into an effective light transmitting zone 211 and a non-effective light transmitting zone 212 any longer. Correspondingly, the ink filling layer 12 is no longer divided into a first zone 121 corresponding to the effective light transmitting zone 211 and a second zone 122 corresponding to the non-effective light transmitting zone 212. In other words, the ink filling layer 12 includes only an effective light transmitting zone, and the entire ink filling layer 12 is filled with electrowetting ink materials.

In this solution, an electrochromic layer 3 is further provided between the reflective display layer 1 and the emissive display layer 2. Electrochromism is a phenomenon that optical properties (reflectivity, transmittance, absorptivity, and the like) of a material experience a stable and reversible color change under the action of an external electric field, appearing as reversible color and transparency changes. Materials with electrochromic properties are referred to as electrochromic materials. The electrochromic layer 3 can change reflectivity of the electrochromic layer 3 under the action of an external electric field, to switch between a metallic color and a transparent color. When the electrochromic layer 3 is displayed in a metallic color, the reflectivity of the electrochromic layer 3 is highest. When the electrochromic layer 3 is displayed transparent, the reflectivity of the electrochromic layer 3 is lowest. In a grayscale display mode, the reflectivity of the electrochromic layer 3 is not lower than a first threshold, and serves as a reflective metal layer of the reflective display layer 1. In this implementation, the first threshold may be set to 92% to 99%. Ink droplets in an electrowetting structure are driven by a driving waveform to spread or contract, so as to present different grayscale effects. In addition, the emissive display layer 2 is powered off, and displayed in black. Because the electrochromic layer 3 can block light emitted by the emissive display layer 2, in practical application, the emissive display layer 2 may alternatively be displayed in white or other colors.

In a color display mode, the reflectivity of the control electrochromic layer 3 is controlled to be not higher than a second threshold, where the second threshold is less than or equal to the first threshold. In an implementation, to ensure a light transmitting effect of the emissive display layer 2, the second threshold may be set to a value below 1%, so that the electrochromic layer 3 is or nearly transparent. In addition, the second TFT electrode layer 23 is used to control the emissive display module layer 21 to turn colored. At the reflective display layer 1, the ink droplets contract to corners of the pixels under the control of an electric field, so that minimum light emitted by the emissive display layer 2 is blocked out. Colored light emitted by the emissive display layer 2 passes through the transparent electrochromic layer 3 and the reflective display layer 1 and then exits the display to implement imaging. In the prior art, an electrowetting display is provided with a reflective metal layer under a transparent hydrophobic layer. When ink droplets are driven to contract to corners, a main body of an ink filling layer displays a color of the reflective metal layer to achieve an effect of displaying white. In this implementation, that the ink droplets are controlled to contract to corners of the pixels corresponds to a driving waveform used by an electronic ink display to exhibit white in the prior art. In other words, a driving waveform for exhibiting white can make the ink droplets contract to corners of the pixels in a color display mode in this implementation.

In this solution, the reflective metal layer at the ink filling layer 12 is removed, and the electrochromic layer 3 is added. State switching of the electrochromic layer 3 can implement both light transmission of the emissive display layer 2 in the color display mode and a reflection function of the reflective metal layer in the grayscale display mode.

Figure 21:
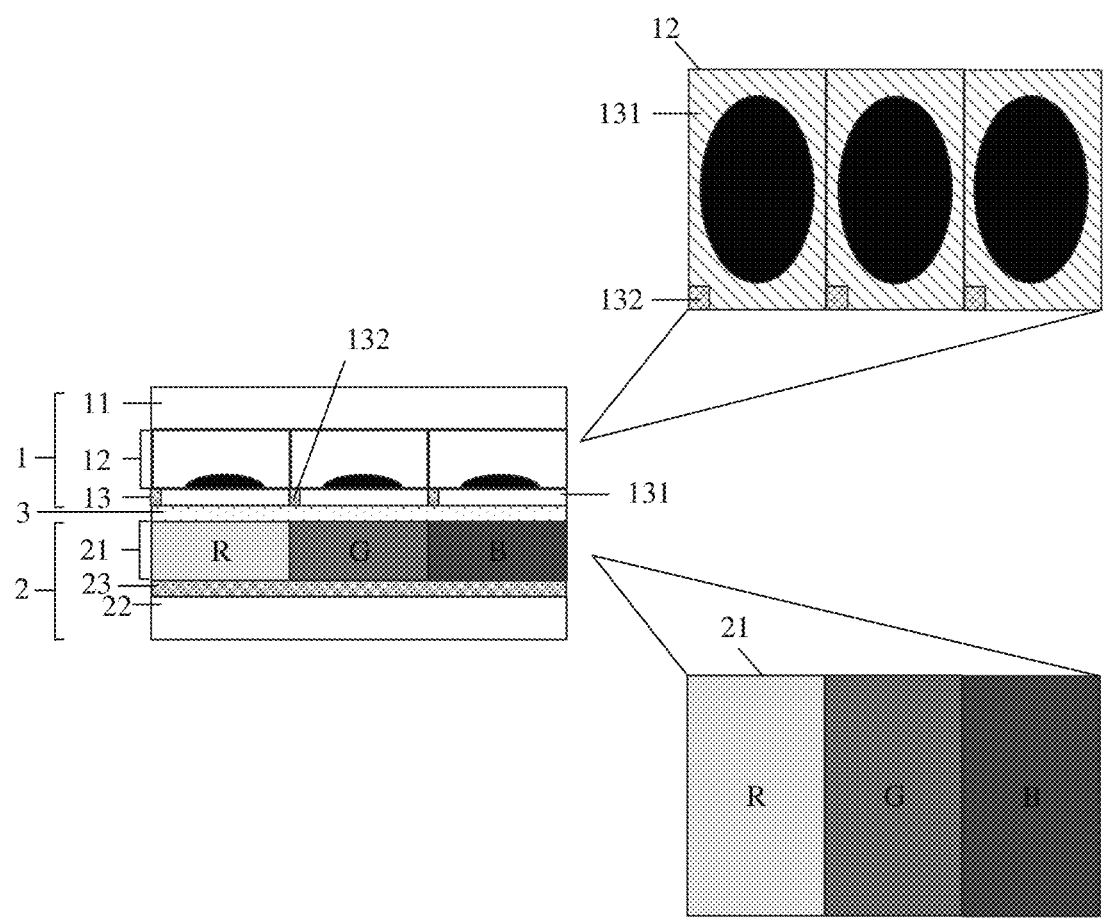
FIG. 21 is a schematic structural diagram of a fifteenth display according to an embodiment of this application.

In practical application, TFT wiring at the first TFT electrode layer 13 occludes some light emitted by the emissive display layer 2, resulting in decreased display quality of the display in the color display mode. In an implementation of this application, the first TFT electrode layer 13 may be divided into a transparent zone and a non-transparent zone, and TFT electrode wiring is arranged in the non-transparent zone. As shown in FIG. 21, at the first TFT electrode layer 13, a zone corresponding to each ink pixel is divided into a transparent zone 131 and a non-transparent zone 132, and the non-transparent zone 132 is provided at the corner of an electro-wetting ink pixel.

Figure 22:
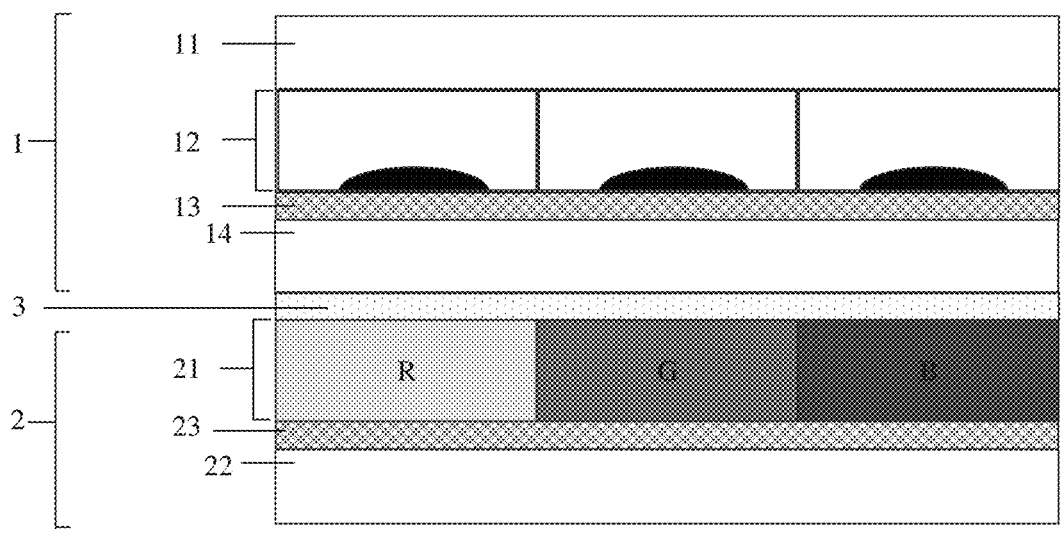
FIG. 22 is a schematic structural diagram of a sixteenth display according to an embodiment of this application.
Figure 23:
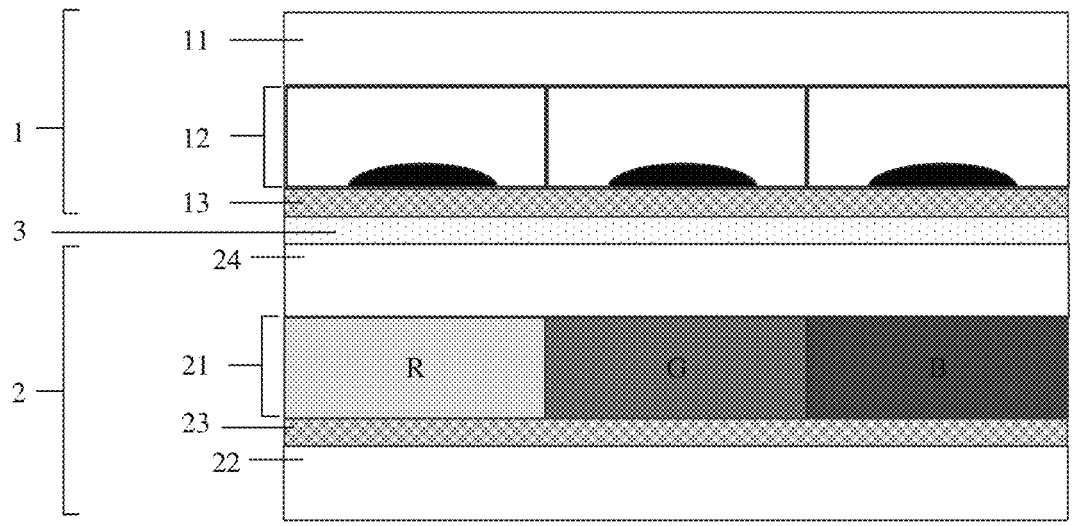
FIG. 23 is a schematic structural diagram of a seventeenth display according to an embodiment of this application.

Similar to the previous solution, on the basis of the solution in FIG. 19 or FIG. 20, a second substrate 14 may be further added at the reflective display layer 1. As shown in FIG. 22, the second substrate 14 is located between the first TFT electrode layer 13 and the electrochromic layer 3. Alternatively, as shown in FIG. 23, a second cover plate 24 may be further added at the emissive display layer 2, and the second cover plate 24 is located under the electrochromic layer 3 and close to the electrochromic layer 3.

The substrate and the cover plate in each example of this application are required to have good light transmittance. Therefore, in practical application, glass base materials may be used as the substrate and the cover plate. Alternatively, at least one of the first cover plate 11, the second substrate 14, the second cover plate 24, and the first substrate 22 may be made of a flexible base material.

In the description of this application, it should be noted that unless otherwise specified and defined explicitly, the terms "mount", "connect", and "join" are to be interpreted broadly. For example, they may refer to a fixed connection, or detachable connection, or an integral union, may refer to a mechanical connection or electrical connection, and may refer to a direct connection or indirect connection through an intermediate medium, or internal communication between two elements. A person of ordinary skill in the art can understand specific meanings of these terms in this application as appropriate to specific situations.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display, comprising:
    a reflective display layer; and
    an emissive display layer disposed under the reflective display layer, wherein the reflective display layer comprises a first cover plate, an ink filling layer, and a first thin-film transistor (TFT) electrode layer arranged from top to bottom, and the emissive display layer comprises an emissive display module layer and a first substrate arranged from top to bottom; and
    the emissive display module layer comprises a plurality of pixels, each pixel comprises an effective light transmitting zone and a non-effective light transmitting zone, each effective light transmitting zone comprises an emissive luminescent material, and each non-effective light transmitting zone comprises a second TFT electrode layer;
    the ink filling layer comprises a first zone corresponding to each effective light transmitting zone and a second zone corresponding to each non-effective light transmitting zone, wherein each second zone is filled with an electronic ink material, each first zone is filled with a color light filter film, and in each first zone a color of the color light filter film is the same as a pixel color in a corresponding effective light transmitting zone; and
    wherein the first TFT electrode layer comprises a transparent zone and a non-transparent zone with respect to each pixel, each transparent zone corresponding to an effective light transmitting zone of a corresponding pixel and each non-transparent zone corresponding to a non-effective light transmitting zone of a corresponding pixel, and TFT electrode wiring in the first TFT electrode layer is arranged in each non-transparent zone.

2. The display according to claim 1, wherein the reflective display layer further comprises a second substrate, and the second substrate is located on a side of the first TFT electrode layer that faces to the emissive display module layer.

3. The display according to claim 1, wherein the emissive display layer further comprises a second cover plate, and the second cover plate is located on a side of the emissive display layer that faces to the first TFT electrode layer.

4. The display according to claim 1, wherein in a grayscale display mode, the first TFT electrode layer controls each second zone of the ink filling layer to display grayscale effects, and the second TFT electrode layer controls each effective light transmitting zone of the emissive display module layer to turn black.

5. The display according to claim 1, wherein in a color display mode, the second TFT electrode layer controls each effective light transmitting zone of the emissive display module layer to turn colored, and the first TFT electrode layer controls each second zone of the ink filling layer to turn black.

6. The display according to claim 1, wherein each second zone is filled with a microcapsule ink material or an electrowetting ink material; and
    wherein the emissive display module layer is an organic light-emitting diode (OLED) display module.

7. The display according to claim 1, wherein each second zone is filled with an electrowetting ink material, and the emissive display module layer is an organic light-emitting diode (OLED) display module, wherein in each second zone, a transparent hydrophobic layer is disposed below ink droplets, and a reflective metal layer is disposed on a side of the transparent hydrophobic layer facing away from the ink droplets; and
    each effective light transmitting zone comprises a cathode layer, an electron injection layer, an electron transport layer, an organic self-luminous layer, a hole transport layer, a hole injection layer, and an anode layer arranged from top to bottom, wherein the organic self-luminous layer is added with organic display materials of different colors.

8. A terminal device, wherein the terminal device comprises a display, and the display comprises:
    a reflective display layer; and
    an emissive display layer disposed under the reflective display layer, wherein
        the reflective display layer comprises a first cover plate, an ink filling layer, and a first thin-film transistor (TFT) electrode layer arranged from top to bottom, and the emissive display layer comprises an emissive display module layer and a first substrate arranged from top to bottom; and
        the emissive display module layer comprises a plurality of pixels, each pixel comprises an effective light transmitting zone and a non-effective light transmitting zone, each effective light transmitting zone comprises an emissive luminescent material, and each non-effective light transmitting zone comprises a second TFT electrode layer; and
    the ink filling layer comprises a first zone corresponding to each effective light transmitting zone and a second zone corresponding to each non-effective light transmitting zone, wherein each second zone is filled with an electronic ink material, each first zone is filled with a color light filter film, and in each first zone a color of the color light filter film is the same as a pixel color in a corresponding effective light transmitting zone; and
    wherein the first TFT electrode layer comprises a transparent zone and a non-transparent zone with respect to each pixel, each transparent zone corresponding to an effective light transmitting zone of a corresponding pixel and each non-transparent zone corresponding to a non-effective light transmitting zone of a corresponding pixel, and TFT electrode wiring in the first TFT electrode layer is arranged in each non-transparent zone.

9. The terminal device according to claim 8, wherein the reflective display layer further comprises a second substrate, and the second substrate is located on a side of the first TFT electrode layer that faces to the emissive display module layer.

10. The terminal device according to claim 8, wherein the emissive display layer further comprises a second cover plate, and the second cover plate is located on a side of the emissive display layer that faces to the first TFT electrode layer.

11. The terminal device according to claim 8, wherein in a grayscale display mode, the first TFT electrode layer controls each second zone of the ink filling layer to display grayscale effects, and the second TFT electrode layer controls each effective light transmitting zone of the emissive display module layer to turn black.

12. The terminal device according to claim 8, wherein in a color display mode, the second TFT electrode layer controls each effective light transmitting zone of the emissive display module layer to turn colored, and the first TFT electrode layer controls each second zone of the ink filling layer to turn black.

13. The terminal device according to claim 8, wherein each second zone is filled with a microcapsule ink material or an electrowetting ink material; and wherein the emissive display module layer is an organic light-emitting diode (OLED) display module.

14. The terminal device according to claim 8, wherein each second zone is filled with an electrowetting ink material, and the emissive display module layer is an organic light-emitting diode (OLED) display module, wherein in each second zone, a transparent hydrophobic layer is disposed below ink droplets, and a reflective metal layer is disposed on a side of the transparent hydrophobic layer facing away from the ink droplets; and each effective light transmitting zone comprises a cathode layer, an electron injection layer, an electron transport layer, an organic self-luminous layer, a hole transport layer, a hole injection layer, and an anode layer arranged from top to bottom, wherein the organic self-luminous layer is added with organic display materials of different colors.

15. A display, comprising:

a reflective display layer; and an emissive display layer disposed under the reflective display layer, wherein the reflective display layer comprises a first cover plate, an ink filling layer, and a first thin-film transistor (TFT) electrode layer arranged from top to bottom, and the emissive display layer comprises an emissive display module layer and a first substrate arranged from top to bottom; and the emissive display module layer comprises a plurality of pixels, each pixel comprises an effective light transmitting zone and a non-effective light transmitting zone, each effective light transmitting zone comprises an emissive luminescent material, and each non-effective light transmitting zone comprises a second TFT electrode layer;

the ink filling layer comprises a first zone corresponding to each effective light transmitting zone and a second zone corresponding to each non-effective light transmitting zone, wherein each second zone is filled with an electronic ink material, each first zone is filled with a color light filter film, in each first zone a color of the color light filter film is the same as a pixel color in a corresponding effective light transmitting zone, and a retaining wall separates each first zone from an adjacent second zone; and wherein the first TFT electrode layer comprises a transparent zone and a non-transparent zone with respect to each pixel, each transparent zone corresponding to an effective light transmitting zone of a corresponding pixel and each non-transparent zone corresponding to a non-effective light transmitting zone of a corresponding pixel, and TFT electrode wiring in the first TFT electrode layer is arranged in each non-transparent zone.

16. The display according to claim 15, wherein the reflective display layer further comprises a second substrate, and the second substrate is located on a side of the first TFT electrode layer that faces to the emissive display module layer.

17. The display according to claim 15, wherein the emissive display layer further comprises a second cover plate, and the second cover plate is located on a side of the emissive display layer that faces to the first TFT electrode layer.

18. The display according to claim 15, wherein in a grayscale display mode, the first TFT electrode layer controls each second zone of the ink filling layer to display grayscale effects, and the second TT electrode layer controls each effective light transmitting zone of the emissive display module layer to turn black.

19. The display according to claim 15, wherein in a color display mode, the second TFT electrode layer controls each effective light transmitting zone of the emissive display module layer to turn colored, and the first TFT electrode layer controls each second zone of the ink filling layer to turn black.

20. The display according to claim 15, wherein each second zone is filled with a microcapsule ink material or an electrowetting ink material; and wherein the emissive display module layer is an organic light-emitting diode (OLED) display module.

* * * * *

UNITED STATES PATENT AND TRADEMARK OFFICE
CERTIFICATE OF CORRECTION

PATENT NO. : 12,481,194 B2  
APPLICATION NO. : 17/760124  
DATED : November 25, 2025  
INVENTOR(S) : Cai et al.

Page 1 of 1

It is certified that error appears in the above-identified patent and that said Letters Patent is hereby corrected as shown below:

In the Claims

In Column 22, in Claim 18, Line 29, delete "TT" and insert -- TFT --.

Signed and Sealed this  
Thirteenth Day of January, 2026

John A. Squires  
*Director of the United States Patent and Trademark Office*